US011345165B2

(12) United States Patent
Murabayashi et al.

(10) Patent No.: US 11,345,165 B2
(45) Date of Patent: May 31, 2022

(54) ELECTRONIC DEVICE

(71) Applicant: BROTHER KOGYO KABUSHIKI KAISHA, Nagoya (JP)

(72) Inventors: Ryohei Murabayashi, Mie (JP); Masakazu Nakano, Nagoya (JP); Yuki Hiramatsu, Nukata-gun (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 451 days.

(21) Appl. No.: 16/274,603

(22) Filed: Feb. 13, 2019

(65) Prior Publication Data

US 2019/0184714 A1 Jun. 20, 2019

Related U.S. Application Data

(63) Continuation-in-part of application No. PCT/JP2017/032160, filed on Sep. 6, 2017.

(30) Foreign Application Priority Data

Sep. 27, 2016 (JP) ............................ JP2016-188892

(51) Int. Cl.
*B41J 3/36* (2006.01)
*B41J 2/35* (2006.01)
(Continued)

(52) U.S. Cl.
CPC . *B41J 3/36* (2013.01); *B41J 2/35* (2013.01); *B41J 3/4075* (2013.01); *B41J 29/393* (2013.01);
(Continued)

(58) Field of Classification Search
CPC ..... B41J 3/36; B41J 3/4075; B41J 2/35; B41J 29/393; B41J 2029/3932; H01M 10/48;
(Continued)

(56) References Cited

U.S. PATENT DOCUMENTS 9,425,630 B2 * 8/2016 Banerjee .................. H02J 7/00
2006/0128561 A1 6/2006 Taniguchi et al.
(Continued)

FOREIGN PATENT DOCUMENTS

JP H10-105295 A 4/1998
JP 2003-010695 A 1/2003
(Continued)

OTHER PUBLICATIONS

International Search Report dated Oct. 31, 2017 issued in PCT/JP2017/032610.
(Continued)

*Primary Examiner* — Kristal Feggins
(74) *Attorney, Agent, or Firm* — Scully, Scott, Murphy & Presser, P.C.

(57) ABSTRACT

The disclosure discloses an electronic apparatus including a charging device, a plurality of operation mechanisms, and a CPU. The CPU is configured to execute an information acquisition process, a voltage decision process, and a charging control process. In the information acquisition process, capacity-related information corresponding to a charging capacity required for operation of the operating mechanisms is acquired. In the voltage decision process, a charge stop voltage is decided in accordance with the capacity-related information acquired. In the charging control process, the charging device is controlled to stop the charging process by using as a trigger an attainment of the charge stop voltage decided after start of the charging process.

13 Claims, 12 Drawing Sheets

(51) Int. Cl.

| | |
|---|---|
| ***H01M 10/0525*** | (2010.01) |
| ***B41J 3/407*** | (2006.01) |
| ***B41J 29/393*** | (2006.01) |
| ***H01M 10/42*** | (2006.01) |
| ***H01M 10/44*** | (2006.01) |
| ***H02J 7/00*** | (2006.01) |
| ***H01M 10/46*** | (2006.01) |
| ***H01M 10/48*** | (2006.01) |

(52) U.S. Cl.
CPC ..... *H01M 10/0525* (2013.01); *H01M 10/425* (2013.01); *H01M 10/44* (2013.01); *H01M 10/46* (2013.01); *H01M 10/48* (2013.01); *H02J 7/00* (2013.01); *H02J 7/007* (2013.01); *H02J 7/0045* (2013.01); *B41J 2029/3932* (2013.01); *H01M 2010/4271* (2013.01)

(58) Field of Classification Search
CPC ........... H01M 10/425; H01M 10/0525; H01M 10/46; H01M 10/44; H01M 2010/4271; H01M 50/20; H02J 7/00; H02J 7/007; H02J 7/0045; Y02E 60/10
See application file for complete search history.

(56) References Cited

U.S. PATENT DOCUMENTS

| | | | |
|---|---|---|---|
| 2008/0272653 A1 | 11/2008 | Inoue et al. | |
| 2012/0065427 A1 | 3/2012 | Sudo et al. | |
| 2013/0145184 A1 | 6/2013 | Tatsumoto et al. | |
| 2014/0217984 A1* | 8/2014 | Banerjee ............... | H01M 10/48 320/128 |

FOREIGN PATENT DOCUMENTS

| | | | |
|---|---|---|---|
| JP | 2006-288002 | A | 10/2006 |
| JP | 2007-300738 | A | 11/2007 |
| JP | 2008-155126 | A | 7/2008 |
| JP | 2008-259256 | A | 10/2008 |
| JP | 2009-290906 | A | 12/2009 |
| JP | 2010-051128 | A | 3/2010 |
| JP | 2010-057249 | A | 3/2010 |
| JP | 2010-194853 | A | 9/2010 |
| JP | 2012-148202 | A | 8/2012 |
| JP | 2012-288002 | A | 8/2012 |
| JP | 2012-245433 | A | 12/2012 |
| JP | 2013-118768 | A | 6/2013 |
| JP | 2013-222642 | A | 10/2013 |
| WO | WO 2004/062798 | A1 | 7/2004 |
| WO | 2013/036234 | A1 | 3/2013 |

OTHER PUBLICATIONS

Japanese Office Action dated Aug. 5, 2019 in Japanese Patent Application No. 2016-188892.

English translation of International Preliminary Report on Patentability dated Apr. 11, 2019, together with the Written Opinion received in related International Application No. PCT/JP2017/032160.

International Search Report dated Nov. 21, 2017 issued in International Application No. PCT/JP2017/032160.

* cited by examiner

[FIG. 1]
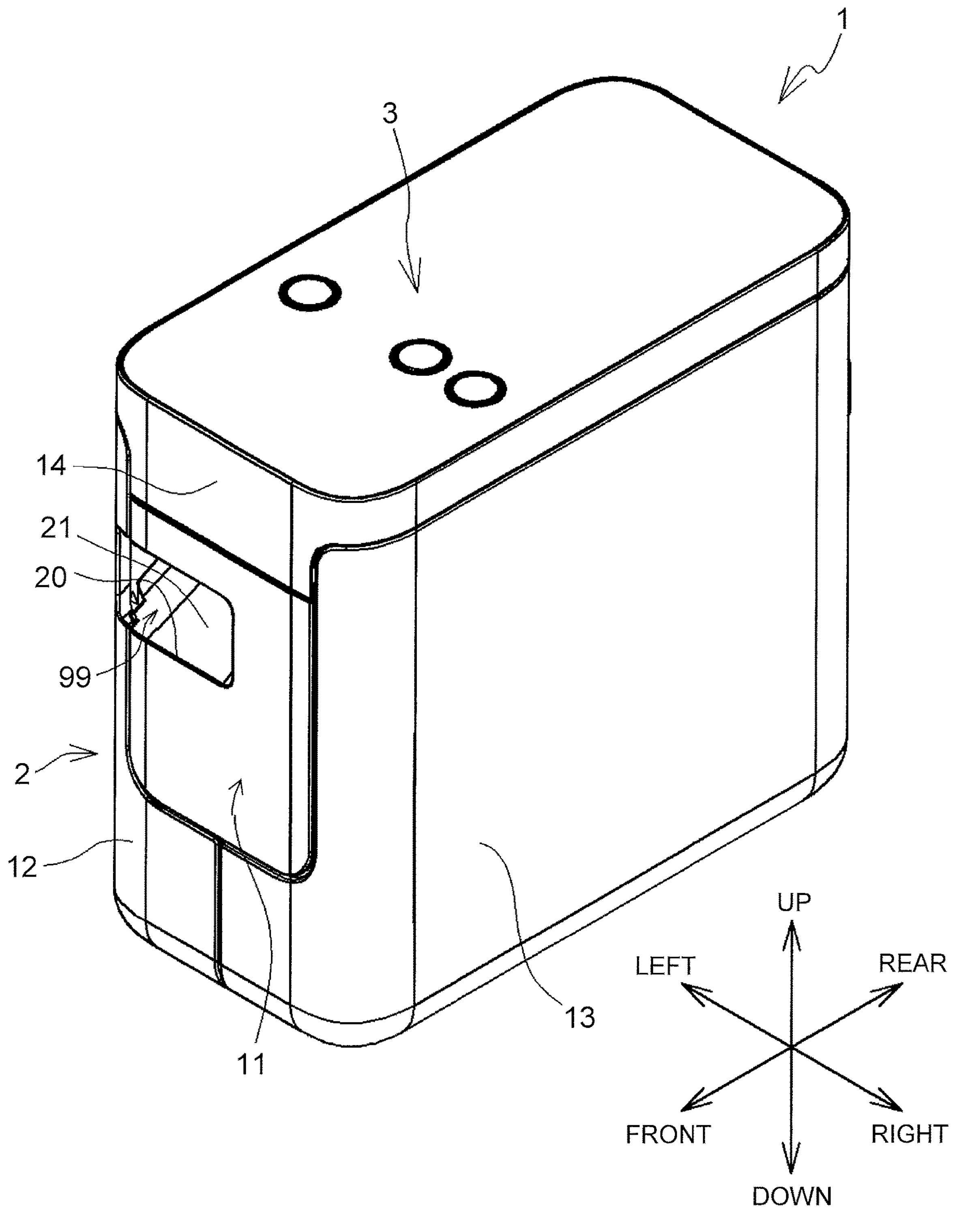

[FIG. 2]
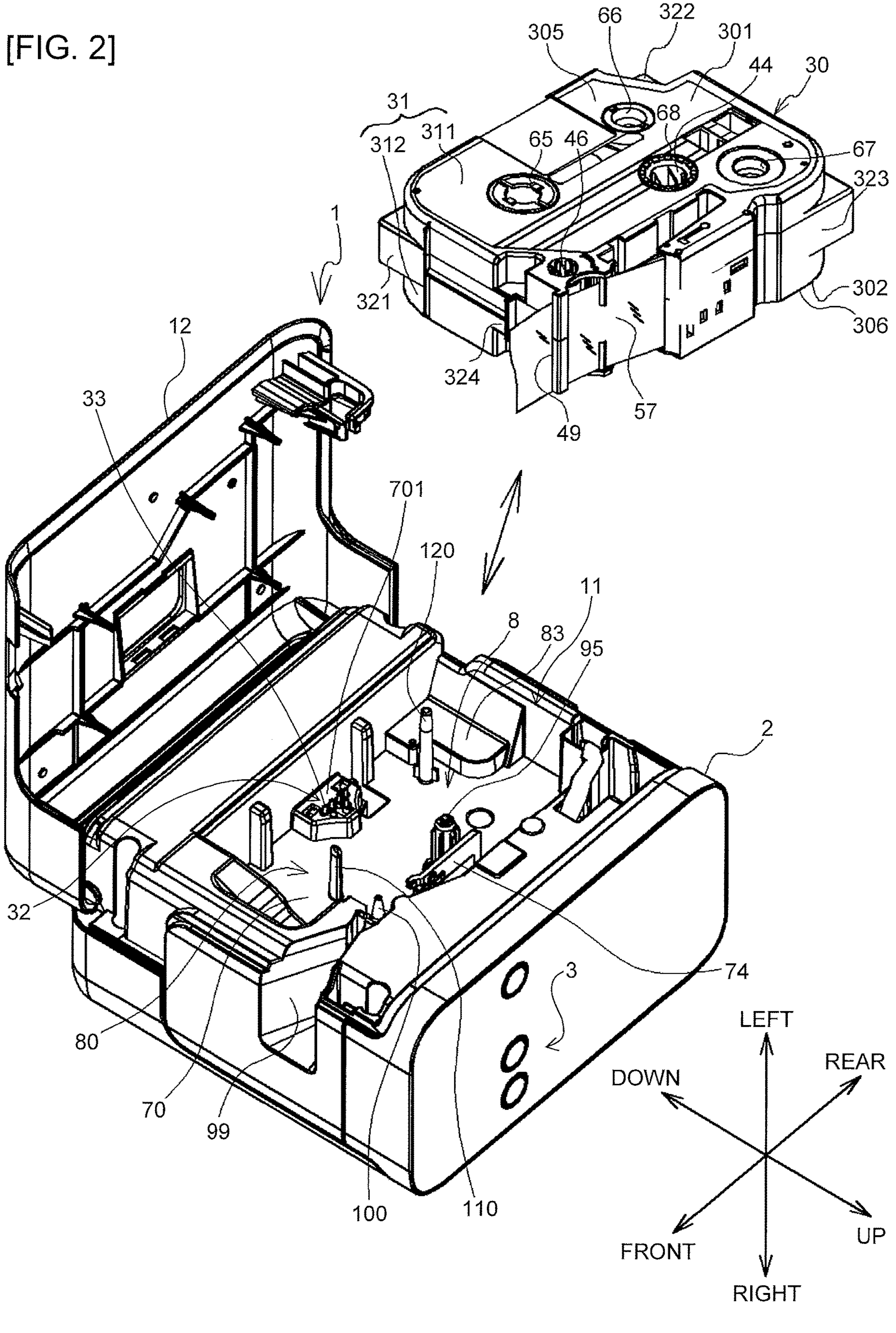

[FIG. 3]
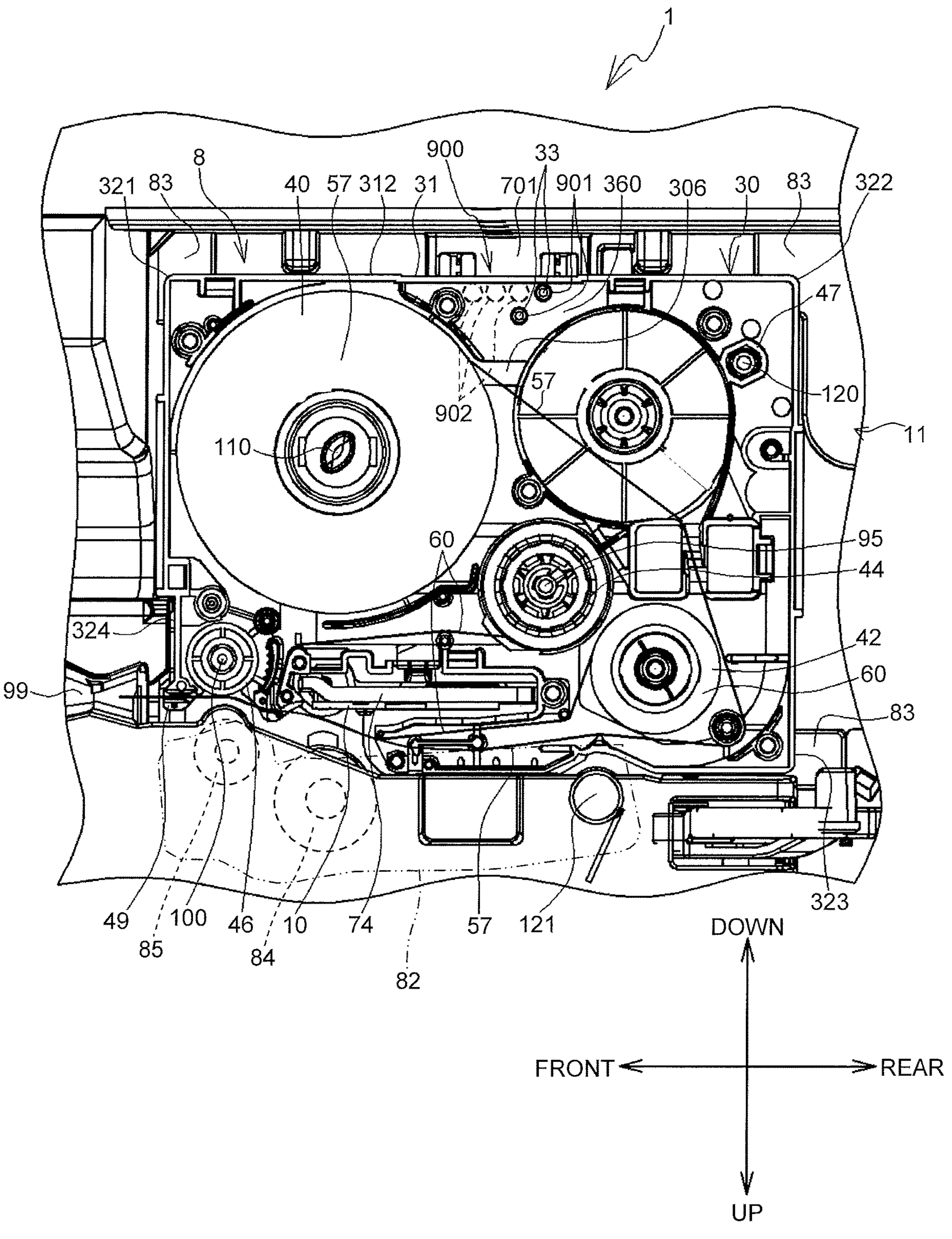

[FIG. 4]
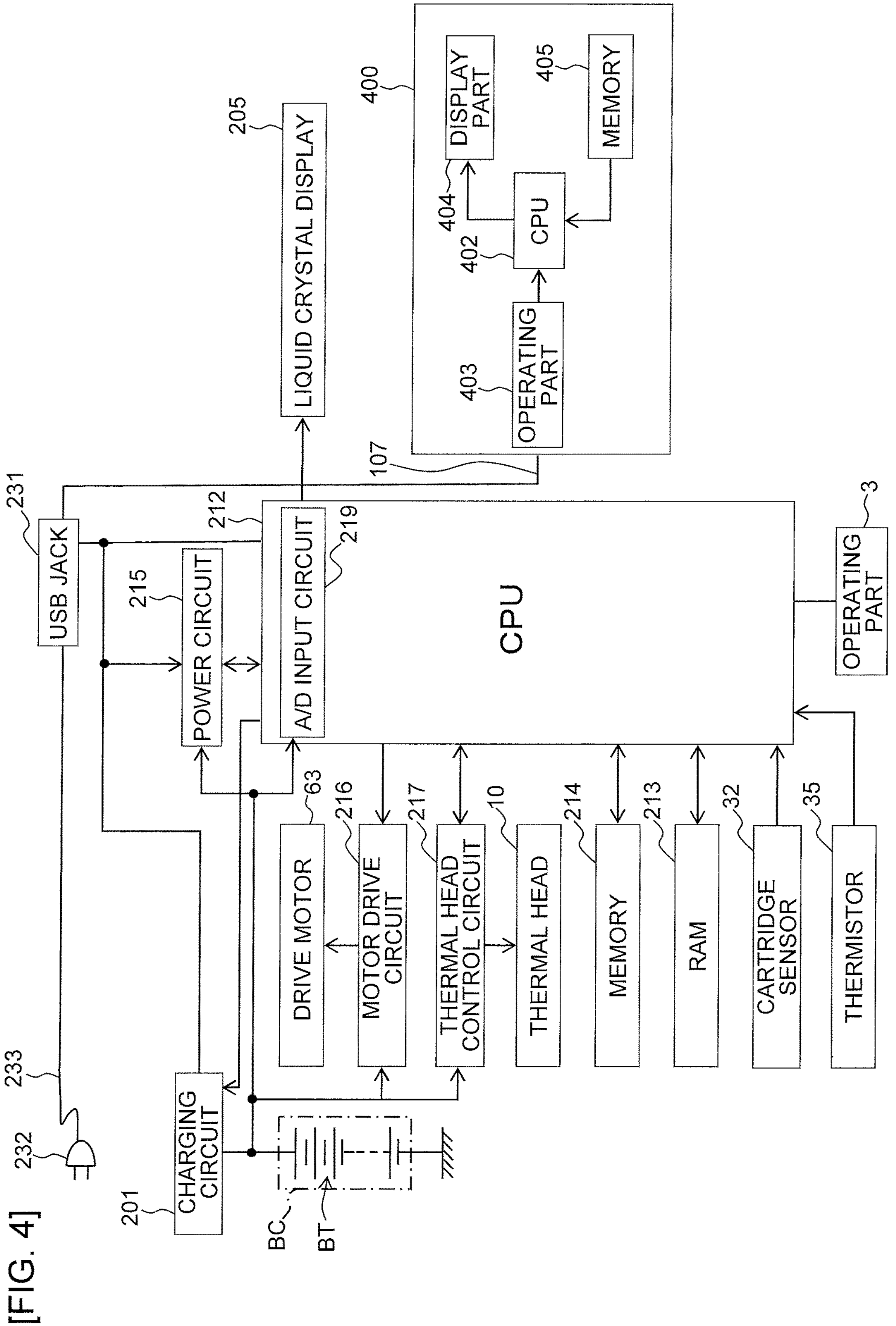

[FIG. 5A]
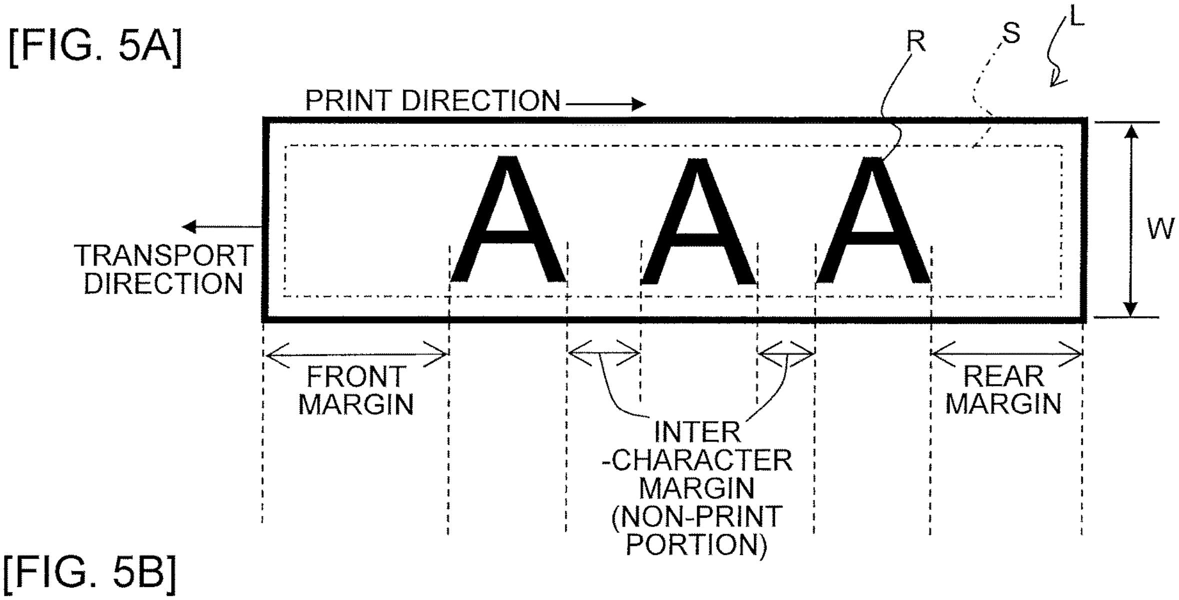
[FIG. 5B]
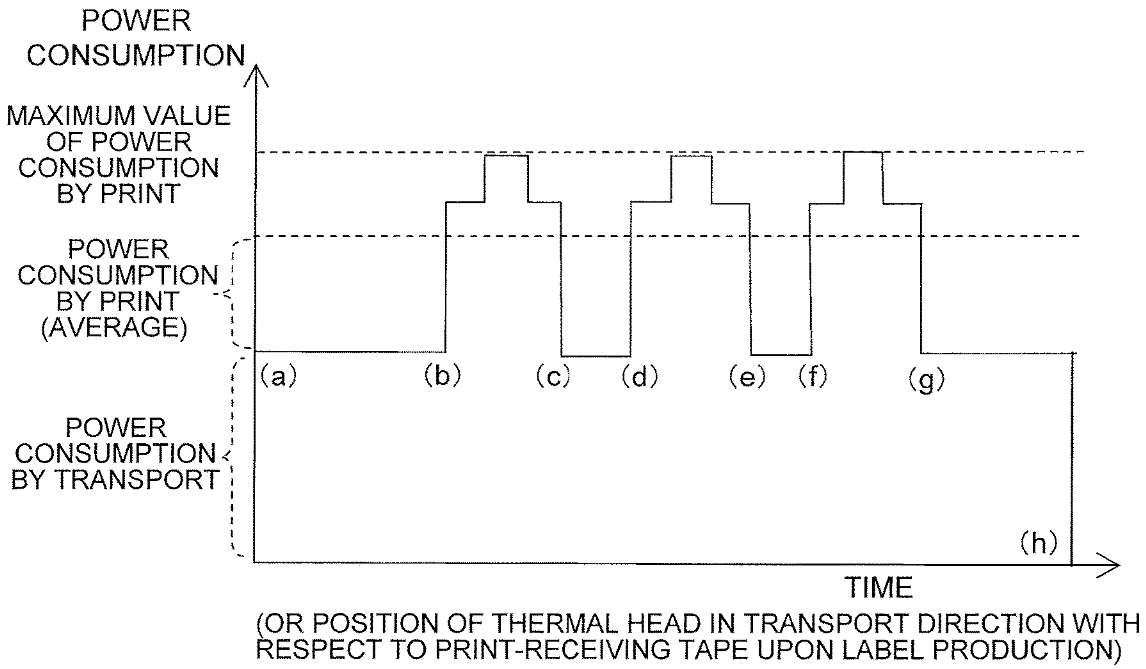
[FIG. 5C]
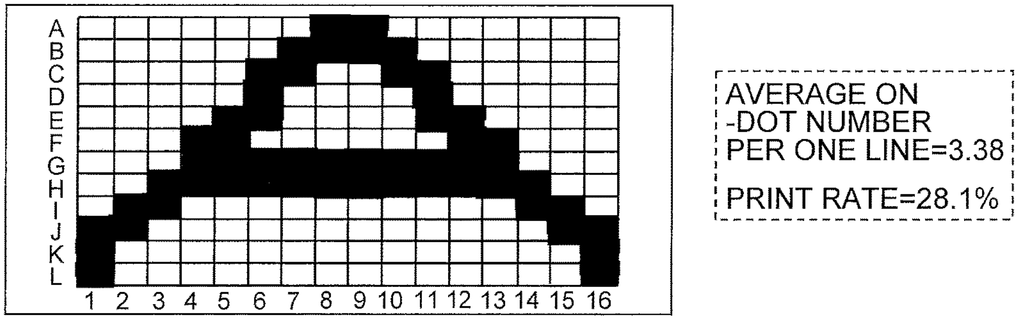

[FIG. 6A]
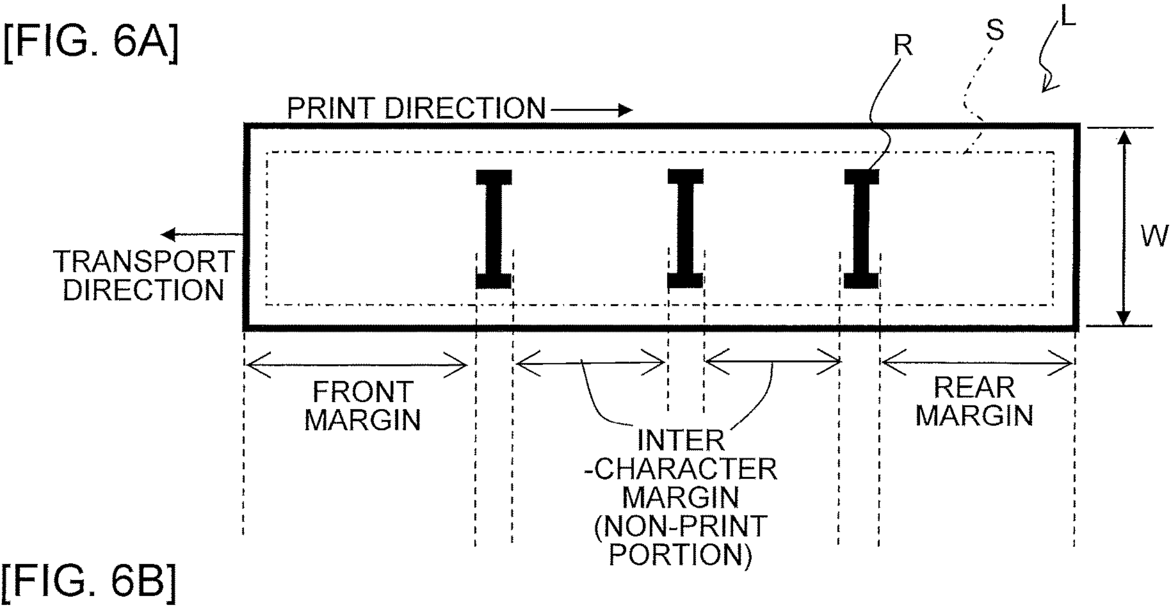
[FIG. 6B]
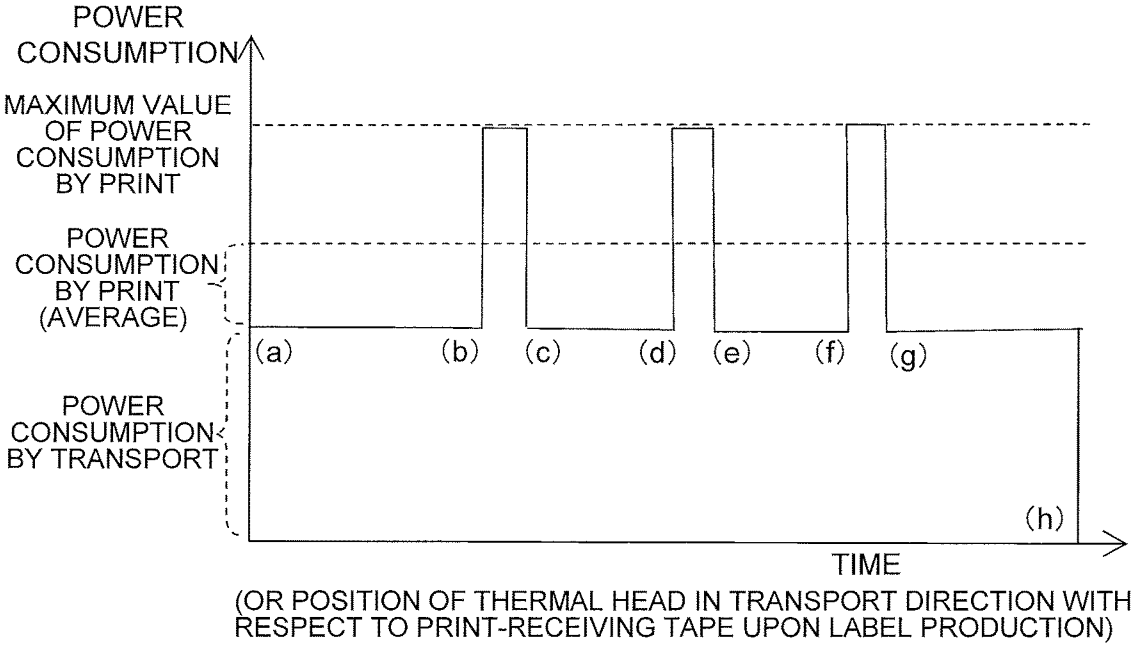
[FIG. 6C]
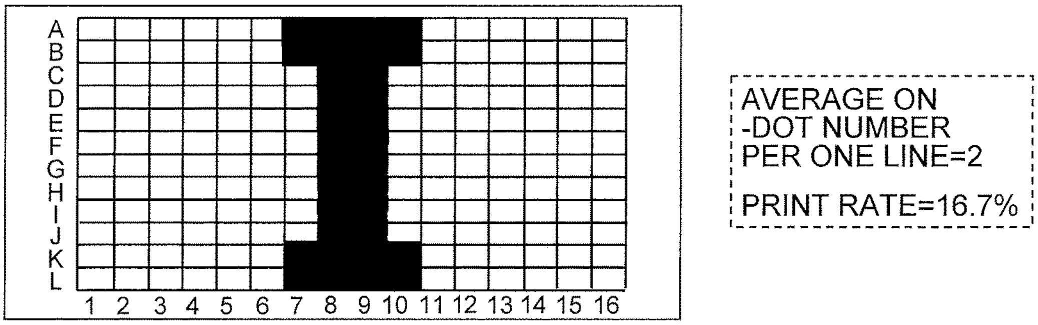

[FIG. 7A]
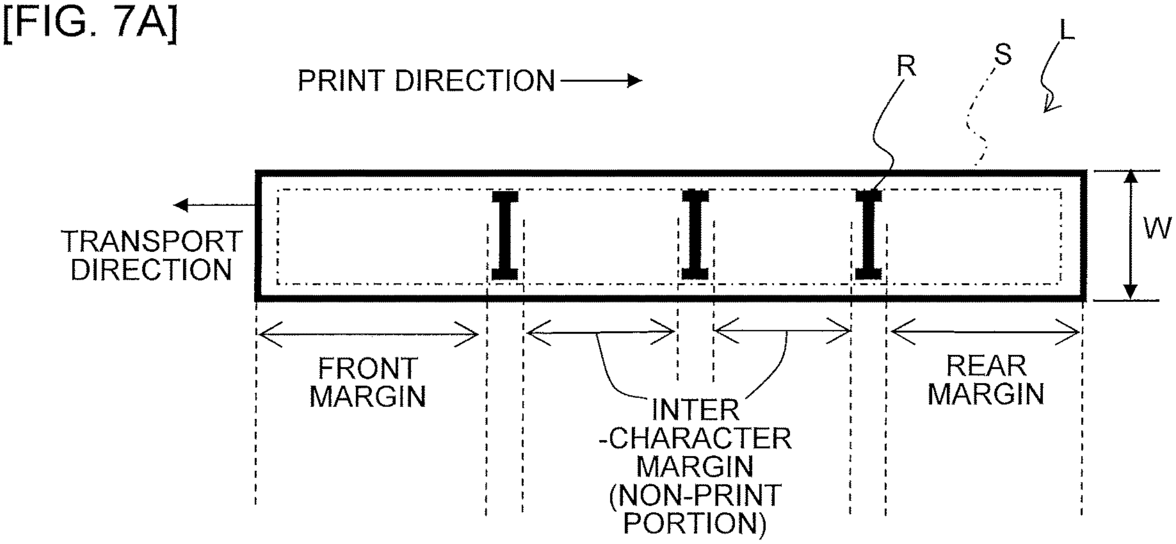
[FIG. 7B]
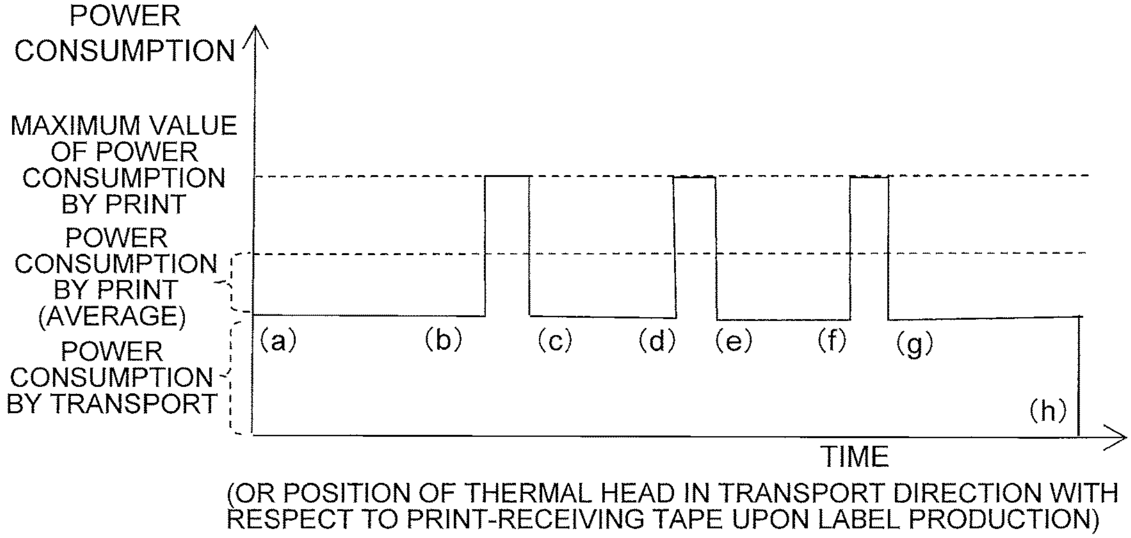

[FIG. 8]
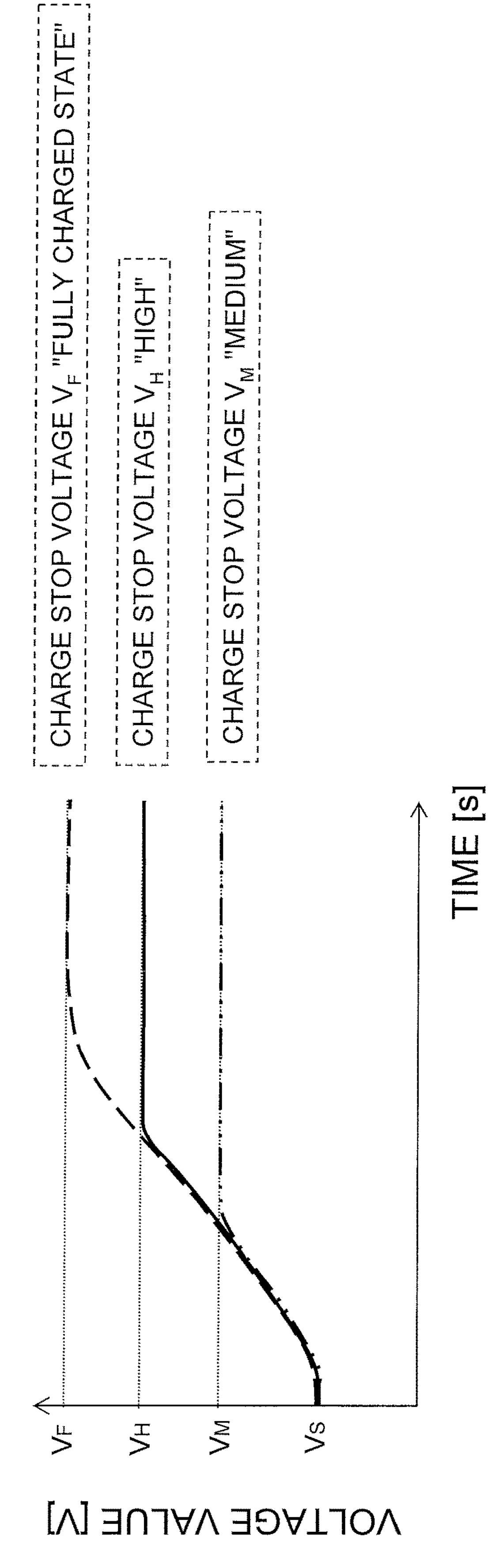

[FIG. 9]

| | TAPE WIDTH | SMALL (6 mm) | | MEDIUM (12 mm) | | LARGE (24 mm) | |
|---|---|---|---|---|---|---|---|
| | TAPE TYPE / AMBIENT ENVIRON-MENTAL TEMPERATURE | SMALL HEAT CAPACITY (NON-LAMINATE) | LARGE HEAT CAPACITY (LAMINATE) | SMALL HEAT CAPACITY (NON-LAMINATE) | LARGE HEAT CAPACITY (LAMINATE) | SMALL HEAT CAPACITY (NON-LAMINATE) | LARGE HEAT CAPACITY (LAMINATE) |
| LARGE PRINT RATE (20% OR MORE) | LOW TEMPERATURE (LESS THAN 10 °C) | ◎ | ◎ | ◎ | ● | ● | ● |
| | HIGH TEMPERATURE (10 °C OR MORE) | ◎ | ◎ | ◎ | ◎ | ● | ● |
| SMALL PRINT RATE (LESS THAN 20%) | LOW TEMPERATURE (LESS THAN 10 °C) | ◎ | ◎ | ◎ | ◎ | ● | ● |
| | HIGH TEMPERATURE (10 °C OR MORE) | ○ | ○ | ○ | ◎ | ◎ | ◎ |

●CHARGE STOP VOLTAGE $V_F$ "FULLY CHARGED STATE"
◎CHARGE STOP VOLTAGE $V_H$ "HIGH"
○CHARGE STOP VOLTAGE $V_M$ "MEDIUM"

[FIG. 10]
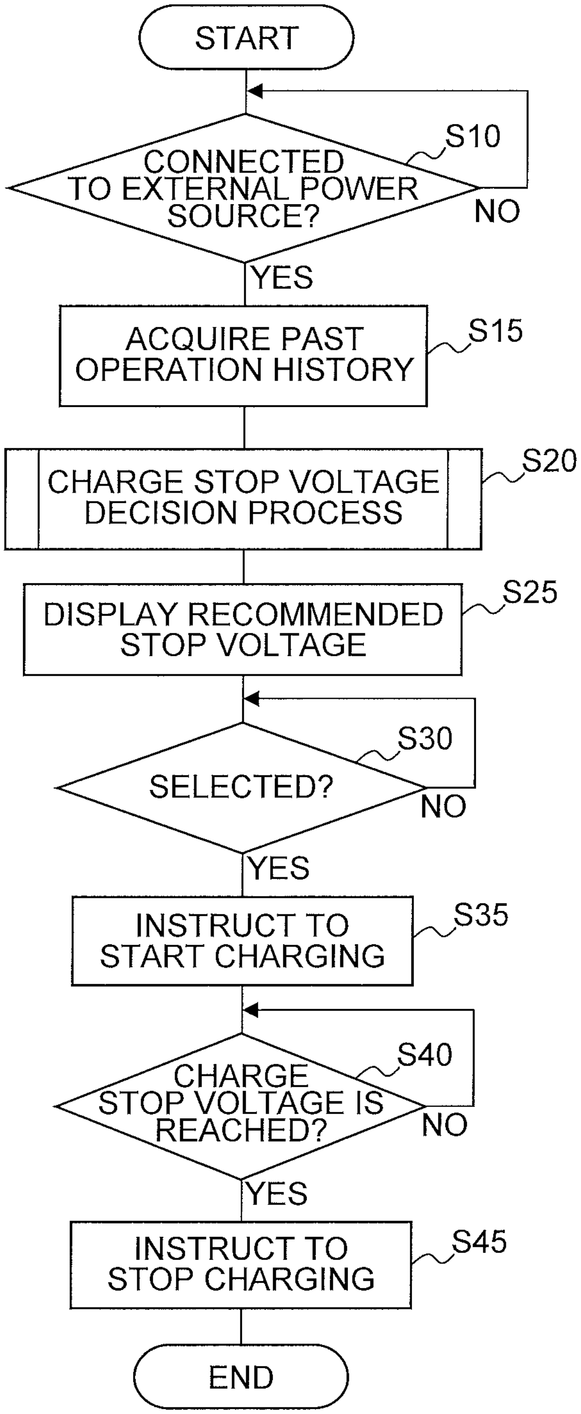

[FIG. 11]
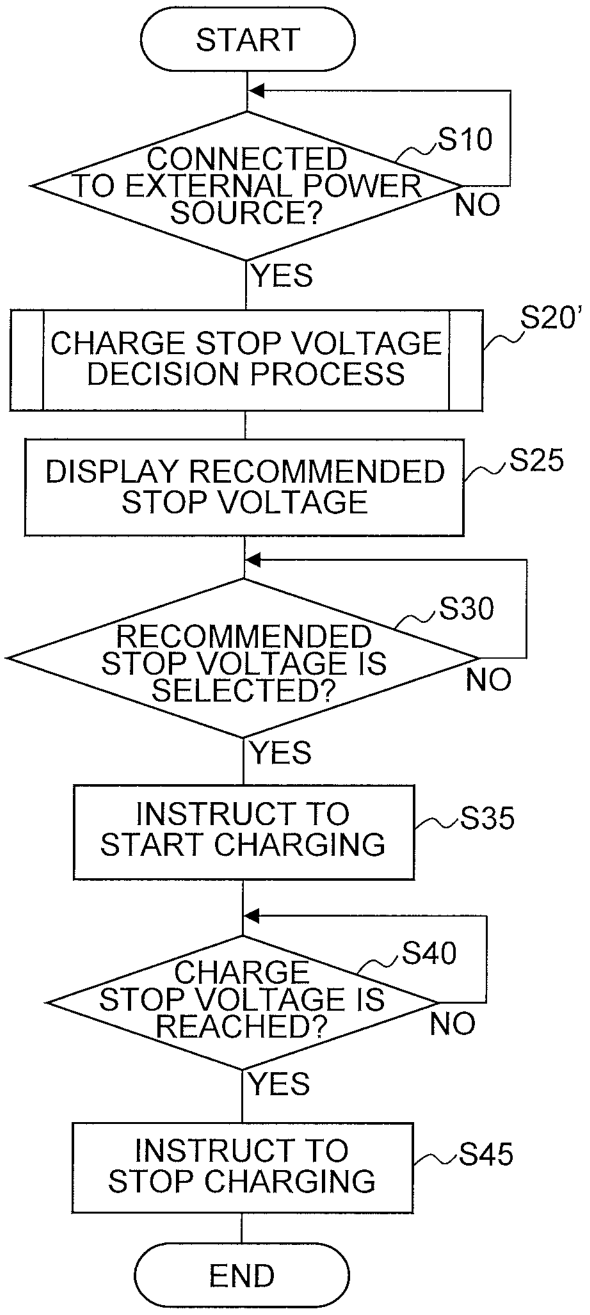

[FIG. 12]
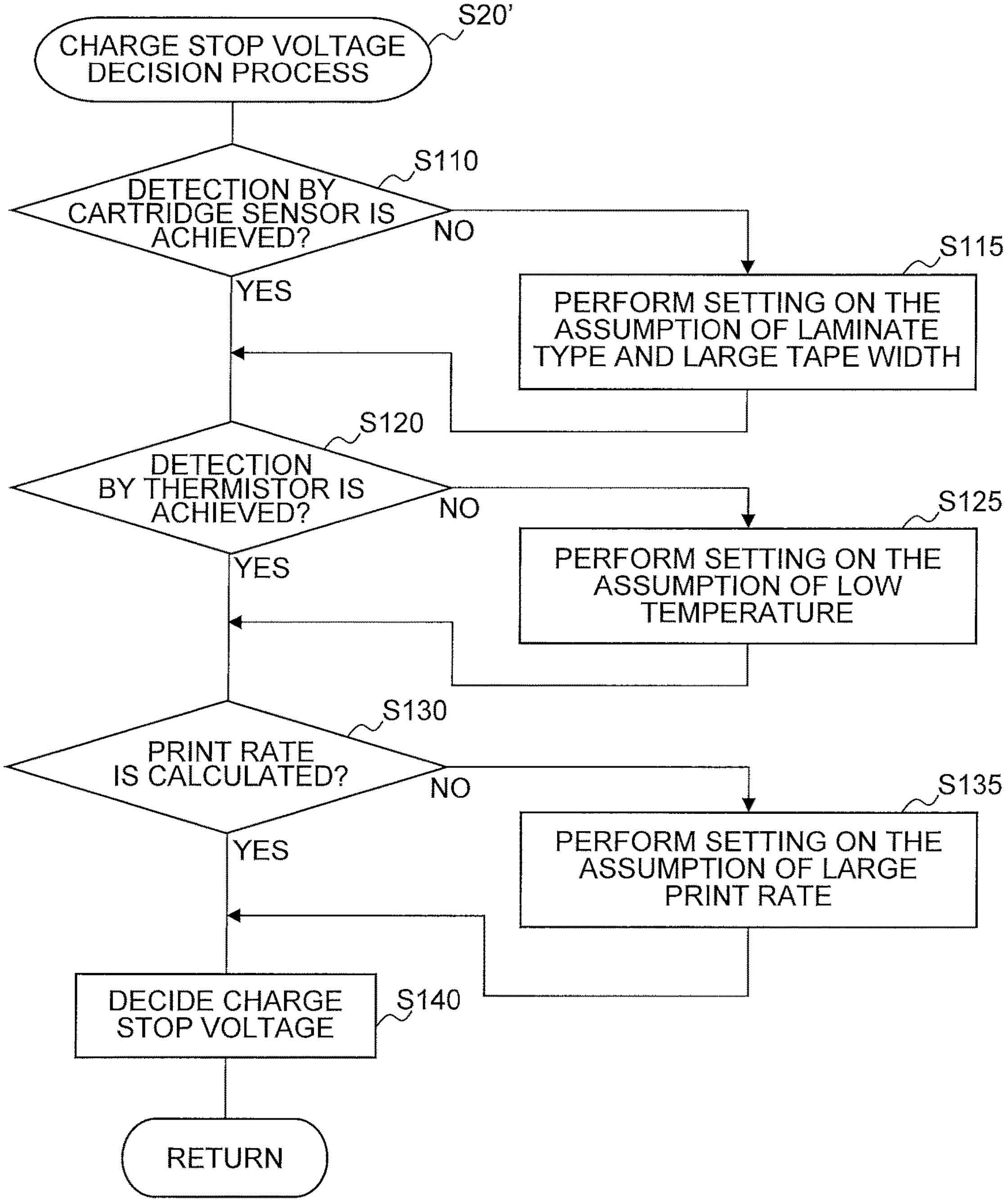

ELECTRONIC DEVICE

CROSS-REFERENCE TO RELATED APPLICATION

This is a CIP application PCT/JP2017/032160, filed Sep. 6, 2017, which was not published under PCT article 21(2) in English.

BACKGROUND

Field

The present disclosure relates to an electronic device operating with electric power from a rechargeable battery power source.

Description of the Related Art

For example, a portable terminal device is known as an electronic device operating with electric power from a rechargeable battery power source. In this prior art, a frequency of charging by an operator is detected, and a charge start voltage is decided in accordance with a detection result so as to reduce the number of times of charging and prolong the life of the battery power source.

On the other hand, a battery power source may quickly deteriorate due to discharging after being charged to a fully-charged state. Therefore, preferably, except when it is particularly highly necessary to achieve the fully-charged state, a charging process is not performed to the fully-charged state (from the viewpoint of prevention of deterioration) and the charging is stopped at a voltage lower than the fully-charged state. In the prior art, (although consideration is given to a reduction of the number of times of charging) no particular consideration is given to prolonging the life of the battery power source by avoiding the fully-charged state each time the charging is performed.

SUMMARY

An object of the present disclosure is to provide an electronic device capable of preventing deterioration of a battery power source and reliably prolonging the life thereof by avoiding a fully-charged state.

In order to achieve the above-described object, according to aspect of the present application, there is provided an electronic apparatus comprising a battery storage part configured to store a battery power source that is rechargeable, a power source connecting part configured to connect the electronic apparatus to an external power source, a charging device configured to perform a charging process from the external power source to the battery power source by using connection of the power source connecting part to the external power source as a trigger, a plurality of operation mechanisms configured to perform predetermined respective operations with electric power supplied from the battery power source, and a CPU, the CPU being configured to execute an information acquisition process for acquiring capacity-related information corresponding to a charging capacity required for operation of the operating mechanisms, a voltage decision process for deciding a charge stop voltage in accordance with the capacity-related information acquired in the information acquisition process, and a charging control process for controlling the charging device to stop the charging process by using as a trigger an attainment of the charge stop voltage decided in the voltage decision process after start of the charging process.

BRIEF DESCRIPTION OF THE DRAWINGS

FIG. 1 is a perspective view representing a label producing apparatus of an embodiment of the present disclosure.

FIG. 2 is a perspective view representing the label producing apparatus and a tape cartridge.

FIG. 3 is a plan view representing the vicinity of a cartridge holder to which the tape cartridge of the label producing apparatus is attached.

FIG. 4 is a function block diagram representing a functional configuration of the label producing apparatus and an operation terminal.

FIG. 5A is a plan view representing an example of a print label to be produced.

FIG. 5B is a conceptual diagram representing an example of change behaviors of the power consumption of operation mechanisms at the time of print label production.

FIG. 5C is a conceptual diagram representing an example of dot pattern data representative of text characters to be print-formed upon print label production.

FIG. 6A is a plan view representing another example of a print label to be produced.

FIG. 6B is a conceptual diagram representing another example of change behaviors of the power consumption of operation mechanisms at the time of print label production.

FIG. 6C is a conceptual diagram representing another example of dot pattern data representative of text characters to be print-formed upon print label production.

FIG. 7A is a plan view representing still another example of a print label to be produced.

FIG. 7B is a conceptual diagram representing a still another example of change behaviors of the power consumption of operation mechanisms at the time of print label production.

FIG. 8 is a graph representing behaviors variably setting a charge stop voltage in accordance with a printing rate, a tape width, a tape type, an ambient environmental temperature, etc.

FIG. 9 is an explanatory view representing an example of a decision table for deciding the charge stop voltage.

FIG. 10 is a flowchart representing a control procedure executed by a CPU.

FIG. 11 is a flowchart representing a control procedure executed by the CPU in a modification example where the charge stop voltage is decided on the basis of the tape width, etc. detected in real time at the time of start of charging process.

FIG. 12 is a flowchart representing a detailed procedure at step S20' of FIG. 11.

DETAILED DESCRIPTION OF THE PREFERRED EMBODIMENTS

An embodiment of the present disclosure will hereinafter be described with reference to the drawings. This embodiment is an example of an electronic device, in which the present disclosure is applied to a label producing apparatus 1 drivable by a rechargeable battery power source BT (see FIG. 4 described later).

In the following description, "front", "rear", "left", "right", "top", and "bottom" used with the label producing apparatus 1 correspond respectively to the directions of arrows appropriately indicated in views of FIG. 1, etc.

<Overall Structure of Label Producing Apparatus>

The label producing apparatus 1 as the electronic device of this embodiment is a general-purpose apparatus that can produce a print label solely using various types of tape cartridges such as receptor type (=non-laminate type) and laminate type. Hereinafter, in this embodiment, the case will mainly be described as an example where the receptor type cartridge is attached.

As shown in FIG. 1, the label producing apparatus 1 (equivalent to a printer) comprises a body part 11 covered by a body cover 2 of a substantially rectangular parallelepiped shape. The body cover 2 has a left cover 12, a right cover 13, and a top cover 14 which cover a left portion, a right portion, and a top portion, respectively, of the body part 11. The left cover 12 is fitted to a lower left portion of the body part 11 rotatably around a front-rear axis and is disposed so as to allow opening and closing of a cartridge holder 8 (see FIG. 2 described later) disposed on a left side surface of the body part 11. The right cover 13 is removably attached to a right side surface of the body part 11 and is disposed so as to allow opening and closing of a battery storage part BC (see FIG. 4 described later) disposed on a right portion of the body part 11. The battery storage part BC can store a different type of rechargeable battery power source BT (see FIG. 4 described later) including a lithium-ion battery or a nickel-metal hydride battery for example. In this example, the lithium-ion battery is used as the battery power source BT.

The above described top cover 14 has on its top surface an operating part 3 for operating the label producing apparatus 1, and a liquid crystal display 205 (see FIG. 4 described later). The operating part 3 comprises buttons for various operations, such as a power button and a cutter button. The body part 11 has on its front a discharge part 99 having a slope 21 connected to a label discharge port 20. A print label (not shown) formed by the label producing apparatus 1 is delivered through the discharge part 99 to the discharge port 20 and is ejected from the discharge port 20 to the exterior of the label producing apparatus 1.

A universal serial bus (USB; see FIG. 4 described later) jack 231 not shown for communication/power connection, etc. are arranged on a rear surface of the body part 11.

The label producing apparatus 1 is connected to an operation terminal 400 (see FIG. 4 described later) such as a personal computer via a USB cable 107 (see FIG. 4 described later) connected to the USB jack 231. The label producing apparatus 1 then performs a desired printing on a print-receiving tape 57 (see FIGS. 2 and 3 described later), on the basis of printing data, such as characters, numerals, and graphics, transmitted from the operation terminal 400. The label producing apparatus 1 and the operation terminal 400 may be connected by wireless communication. When a USB cable 233 (equivalent to a power connection part; see FIG. 4 described later) is connected to the USB jack 231, the label producing apparatus 1 is connected via the USB cable 233 to an AC power source (equivalent to an external power source) not shown. Other means than the above described USB cable, such as e.g. a power cable or a charging holder (with a receiving terminal), may be used as the power connection part for connecting the label producing apparatus 1 to the above described external power source.

<Internal Structure of Apparatus>

An internal structure of the label producing apparatus 1 will be described. As shown in FIGS. 2 and 3, the above described cartridge holder 8 allowing attachment and detachment of a tape cartridge 30 is disposed on the left side surface of the body part 11. The cartridge holder 8 is formed including a cavity 80, corner support surfaces 83, a recess 70, and a lower support surface 701. The cavity 80 is a recessed portion that is recessed so as to substantially correspond to the shape of a bottom surface 302 of a cassette case 31. The corner support surfaces 83 are disposed on a lower rear portion, a lower front portion, and an upper rear portion, respectively, of the above described cartridge holder 8. The lower support surface 701 is disposed on a lower portion of the cartridge holder 8 at its center in the front-rear direction thereof. The corner support surfaces 83 and the lower support surface 701 are on a plane extending horizontally from outer edges of the cavity 80. In the case that the tape cartridge 30 is attached to the cartridge holder 8, the corner support surfaces 83 support lower surfaces of corners of the tape cartridge 30, while the lower support surface 704 supports a lower recessed wall 360 (see FIG. 3) of the tape cartridge 30.

A head holder 74 formed from a plate-like member extending along the front-rear direction stands vertically on the cartridge holder 8 at its substantially central position closer to the upper end thereof. The head holder 74 has on its upper surface a thermal head 10 (equivalent to an example of an operation mechanism) with a heating element (not shown). A ribbon take-up shaft 95 stands vertically in the rear of the head holder 74. The ribbon take-up shaft 95 is a shaft that can be attached to and detached from a ribbon take-up roller 44 of the tape cartridge 30. A tape driving shaft 100 (equivalent to a feeder) stands vertically in front of the head holder 74. The tape driving shaft 100 is a shaft that can be attached to and detached from a feeding roller 46 of the tape cartridge 30. An auxiliary shaft 110 stands vertically in the lower rear of the tape driving shaft 100. The auxiliary shaft 110 is a shaft that can be attached to and detached from a print-receiving tape roll 40 of the tape cartridge 30. A guide shaft 120 stands vertically at a position closer to the corners in the lower rear of the cartridge holder 8. The guide shaft 120 is a shaft that can be attached to and detached from a guide hole 47 of the tape cartridge 30.

A drive motor 63 (see FIG. 4 described later) in the form of a stepping motor is disposed on the right side of the cartridge holder 8 of the body part 11. The ribbon take-up roller 44 (ribbon take-up shaft 95), the feeding roller 46 (tape driving shaft 100), and a platen roller 84 described later are connected via a plurality of gears not shown to the drive motor 63 (equivalent to an example of the operation mechanism). Driving the drive motor 63 causes rotations of the ribbon take-up roller 44, the feeding roller 46, and the platen roller 84.

A cartridge sensor 32 (equivalent to an example of a detection part) having a plurality of (five in this example) vertically extending sensor protrusions 33 for being pressed is disposed on the above described lower support surface 701 at a substantial center in the front-rear direction in the lower portion of the above described cartridge holder 8. When the tape cartridge 30 is attached to the cartridge holder 8, a portion 900 to be detected disposed on the tape cartridge 30 faces the sensor protrusions 33. Then, the portion 900 to be detected selectively presses the sensor protrusion 33 that corresponds to e.g. a combination of the tape width of the print-receiving tape 57 (equivalent to a print substrate) corresponding to the type of the tape cartridge 30 and the tape type of e.g. whether to be of the laminate type or the non-laminate type. The cartridge sensor 32 outputs a detection signal representative of type information (such as tape width and the tape type) of the tape cartridge 30, on the basis of an on/off combination of the sensor protrusion 33 at that time.

An arm-like platen holder 82 extending along the front-rear direction is disposed upper external to the cartridge holder 8 of the body part 11. The platen holder 82 is pivotally supported around a pivot 121. The above described platen roller 84 and a pressing roller 85 are rotatably pivoted at a left end of the platen holder 82. The platen roller 84 faces the thermal head 10 so as to be able to come into contact with or away from the thermal head 10. The pressing roller 85 faces the feeding roller 46 so as to be able to come into contact with or away from the feeding roller 46. When the left cover 12 is closed, the platen holder 82 moves toward the cartridge holder 8 by a cam mechanism not shown, allowing the platen roller 84 disposed on the platen holder 82 to move to a print position at which it comes into contact with the thermal head 10. At the print position, the platen roller 84 presses the thermal head 10 via the print-receiving tape 57 and an ink ribbon 60. At the same time, the pressing roller 85 presses the feeding roller 46 via the print-receiving tape 57. In this state, with rotations of the ribbon take-up roller 44, the feeding roller 46, the platen roller 84, and the pressing roller 85, the print-receiving tape 57 and the ink ribbon 60 within the interior of the tape cartridge 30 are transported so that print onto the print-receiving tape 57 is carried out by the thermal head 10 transferring ink of the ink ribbon 60.

A label cutter mechanism not shown is disposed between the discharge part 99 of the body part 11 and the feeding roller 46. The label cutter mechanism comprises a fixed blade and a movable blade so that, when the cutter button of the operating part 3 is pressed, the movable blade advances toward the fixed blade to cut a printed print-receiving tape 57, to thereby generate a print label not shown.

<Structure of Cartridge>

A structure of the tape cartridge 30 will be described. As described above, in this example, the case of the receptor type (non-laminate type) cartridge will be described by way of example. As shown in FIGS. 2 and 3, the tape cartridge 30 comprises a generally substantially rectangular parallelepiped (box-shaped) case 31 having rounded corners in plan view. The case 31 includes a first case 311 (upper side in FIG. 2) and a second case 312 (lower side in FIG. 2). The first case 311 includes a left side plate 305 forming a left side surface 301 of the case 31 and is fixed to the periphery of an opening of the second case 312. The second case 312 includes a bottom plate 306 forming a bottom surface 302 of the case 31.

The case 31 has four corners 321-324 formed to have the same width (the same length in the up-down direction of FIG. 2). That is, they are a first corner 321 on the lower front side of the case 31, a second corner 322 on the lower rear side, a third corner 323 on the upper rear side, and a fourth corner 324 on the upper front side. The first to third corners 321-323 protrude outward from the side surfaces of the case 31 in such a manner as to make right angles in plan view. The fourth corner 324 does not make a right angle because a discharge guide 49 guiding a tape discharged from the tape cartridge 30 is disposed at the corner. The corners 321-323 are positions supported by ribs (not shown) arranged on corner support surfaces 83 disposed on the cartridge holder 8 when the tape cartridge 30 is attached to the cartridge holder 8.

The case 31 comprises four support holes 65-68 for rotatably supporting rolls, etc. disposed within the case 31. That is, they are a tape roll support hole 65 on the lower front side of the case 31, a cover film roll support hole 66 on the lower rear side, a ribbon roll support hole 67 on the upper rear side, and a ribbon take-up roll support hole 68 between the tape roll support hole 65 and the ribbon roll support hole 67.

The tape roll support hole 65 rotatably supports the print-receiving tape roll 40 into which the print-receiving tape 57 is wound. The print-receiving tape 57 has e.g. a 4-layer structure including a print-receiving layer, a tape base layer, an affixing adhesive layer, a separation material layer and is withdrawn from the print-receiving tape roll 40 for being subjected to print formation using the ink ribbon 60 by thermal head 10, after which it is guided toward the discharge part 99. The ribbon roll support hole 67 rotatably supports an ink ribbon roll 42 into which the ink ribbon 60 is wound. The ink ribbon 60 is withdrawn from the ink ribbon roll 42 and is superimposed with the print-receiving tape 57 (in more detail, the above described image receiving layer) withdrawn from the print-receiving tape roll 40 so that ink from the ink ribbon 60 is transferred to the above described image receiving layer by receiving heat from the thermal head 10 to perform print formation. The ribbon take-up roll support hole 68 rotatably supports the ribbon take-up roller 44. The ribbon take-up roller 44 takes up the ink ribbon 60 that has been used for print.

In the case of the laminate type tape cartridge 30 for example, the above described tape roll support hole 65 rotatably supports a base tape roll into which a base tape (not shown) is wound that has a 4-layer structure including the separation material layer, the affixing adhesive layer, the tape base layer, and a bonding adhesive layer, while the cover film roll support hole 66 rotatably supports a cover film roll (not shown) into which a cover film as the print-receiving tape is wound. The above described cover film fed out and transported from the cover film roll is then subjected to print formation using the ink ribbon 60 by the thermal head 10 as described above, after which the print-formed cover film is bonded to the above described bonding adhesive layer of the above described base tape. As a result, a printed label tape is generated that has a 5-layer structure including the separation material layer, the affixing adhesive layer, the tape base layer, the bonding adhesive layer, and the cover film (on which print has been formed).

The lower recessed wall 360 is disposed on the lower portion of the case 31 at its substantially central position in the front-rear direction. The lower recessed wall 360 is a wall portion forming a recess that is a part of the bottom plate 306 recessed from the bottom surface 302 leftward (in the front direction of the paper of FIG. 3), and has a shape substantially corresponding to the lower support surface 701 of the cartridge holder 8. The portion 900 to be detected indicative of type information of the tape cartridge 30 is disposed on the lower recessed wall 360.

The portion 900 to be detected indicates the type information of the tape cartridge 30 by combinations of apertures 901 (unpressed portions) and surfaces 902 (pressing portions) formed on the lower recessed wall 360 that face the five sensor protrusions 33 of the cartridge sensor 32 disposed on the apparatus body part 11. In this embodiment, the portion 900 to be detected defines the type information of the tape cartridge 30 that includes the tape width and the tape type (whether to be of the above described non-laminate type having the above described print-receiving layer subjected to direct printing or of the above described laminate type in which the cover film after printing and the base material tape are bonded together) of the print-receiving tape 57 in the tape cartridge 30.

The apertures 901 are circular apertures and, in the case that the tape cartridge 30 is attached to the cartridge holder 8, function as unpressed portions that the sensor protrusions 33 do not press, allowing the sensor protrusions facing the apertures 901 to turn off. In the case that the tape cartridge 30 is attached to the cartridge holder 8, the surfaces 902 function as pressing portions that press the sensor protrusions 33, allowing the sensor protrusions 33 facing the surfaces 902 to turn on.

<Control System of Printer and Operation Terminal>

A control system of the label producing apparatus 1 and the operation terminal 400 will next be described with reference to FIG. 4.

As shown in FIG. 4, the label producing apparatus 1 comprises a CPU 212. While utilizing a temporary storage function of a RAM 213, the CPU 212 performs signal processing in accordance with a program stored in advance in a memory 214 (equivalent to a first memory and a second memory), thereby performing control of the entire label producing apparatus 1.

The CPU 212 includes an A/D input circuit 219 for detecting an output voltage value of the battery power source BT. The battery power source BT is connected to this A/D input circuit 219.

The CPU 212 is connected to an AC power source not shown by allowing the USB cable 233 connected to an AC power plug 232 to connect to the USB jack 231, and is connected to: a power circuit 215 performing power on/off processing of the label producing apparatus 1; a charging circuit 201 (equivalent to a charging device) performing charging process described later; a motor drive circuit 216 performing drive control of the above described drive motor 63 driving the above described feeding roller 46 (platen roller 84); a thermal head control circuit 217 performing energization control of the heating element of the thermal head 10; the above described cartridge sensor 32 detecting the type of the tape cartridge 30 attached to the cartridge holder 8; and a thermistor 35 (equivalent to an example of the detection part) detecting an ambient environmental temperature of the above described thermal head 10, the drive motor 63, etc.

The CPU 212 connects further to: the above described operating part 3; the above described liquid crystal display 205 displaying characters, visual objects, etc.; the above described memory 214; and the above described RAM 213. The memory 214 stores control programs for executing a battery power source BT charging procedure and a label producing procedure (steps shown in FIGS. 11, 12, 13, etc. described later).

The operation terminal 400 comprises a control system having a CPU 402. The CPU 402 connects to an operating part 403, a display part 404, a memory 405, etc. This operation terminal 400 is connected via the USB cable 107 described above to the label producing apparatus 1 and is disposed so as to enable signal transmission/reception between the operation terminal 400 and the label producing apparatus 1.

That is, when the tape cartridge 30 is attached to the above described cartridge holder 8, the cartridge sensor 32 detects the tape cartridge 30 to acquire the type information (tape width, tape type) of the tape cartridge 30. The acquired type information of the tape cartridge 30 is then transmitted from the label producing apparatus 1 to the operation terminal 400. As a result, previous to the production of print data, the operation terminal 400 side can display the tape width and the tape type of the print-receiving tape 57 in the tape cartridge 30 being currently attached thereto, on e.g. an editing screen of the display part 104, so that the operator can recognize them in advance.

The operator produces print data for print formation and operates the operating part 403 so that a predetermined label production instruction containing the above described print data is output to the label producing apparatus 1 so that print label production is carried out in the label producing apparatus 1.

In the above basic configuration, a feature of this embodiment lies in that at the time of charging of the battery power source BT, the charging process of the battery power source BT is carried out so that charging is stopped at a lower voltage than the fully charged state if there is no need for the fully charged state. Hereinafter, a technique of the above described charging process in this embodiment will be described in sequence.

<Charging Process>

The label producing apparatus 1 of this embodiment comprises the above described operation mechanisms (the thermal head 10, the drive motor 63, etc. in the above example). As described above, the above described operation mechanisms perform their respective predetermined motions (transport of the print-receiving tape 57, print formation on the print-receiving tape 57) by electric power from the battery power source BT stored in the battery storage part BC. The battery power source BT is then subjected to the charging process from the AC power source (via the USB cable 233) that is triggered by connection of the above described AC power plug 232 to the above described AC power source.

<Suppression of Deterioration in Battery Power Source Based on Acquisition of Capacity-Related Information>

At this time, if the battery power source BT is discharged after charging up to the fully charged state, the battery power source BT itself may deteriorate and shorten its life (this tendency is strong in the case of the lithium-ion battery in particular). For this reason, this embodiment acquires capacity-related information corresponding to the charging capacity needed for motions of the above described operation mechanisms, which is the material for determination of whether the necessity for fully charged state is high or not, and decides a charge stop voltage in accordance with the capacity-related information, to perform the charging process of the battery power source BT.

<Example of Capacity-Related Information>

An example of the above described capacity-related information can first be for example a printing rate of text characters/visual objects, etc. printed on the print-receiving tape 57 and the tape width of the print-receiving tape 57. In the case that the printing rate upon printing on the print-receiving tape 57 is low for example, electric power consumed by the thermal head 10 (in other words, heat energy to be applied by the thermal head 10) may be small. In the case that the tape width (equivalent to the size of a print-receiving matter) is relatively small, electric power consumed by the drive motor 63 (in other words, kinetic energy to be imparted to the drive motor 63) may be small. This will be described using FIGS. 5-7.

<Specific Example of Power Consumption Change Behaviors at the Time of Label Production>

FIG. 5 shows an example of change behaviors of the power consumption (energy consumption) by operation mechanisms (this example takes two mechanisms, i.e. the thermal head 10 and the drive motor 63 by way of example) during the producing operation of a single print label L in the label producing apparatus 1 of this embodiment.

As shown, this example represents change behaviors of the power consumption in the case (see FIG. 5A) that a print R of text characters “AAA” having a relatively large printing rate is formed on a print area S of the above described print-receiving tape 57 with the tape width W, to produce a print label L (see FIG. 5B).

In FIGS. 5A and 5B, in a state where neither the tape transport by the tape driving shaft 100 nor the print R formation on the print area S by the thermal head 10 are performed, there is little power consumption (not shown). Subsequently, when production of the print label L is started, the feeding roller 46 is first driven to perform tape transport of the print-receiving tape 57, etc. As a result, the power consumption by the transport of the drive motor 63 occurs. In the above described print area S, an area (front blank) anterior to the start of print is in a non-energized state (non-print state) in which the above described heating element of the thermal head 10 is not energized, allowing only the power consumption by transport to occur (see (a)-(b) section in FIG. 5B).

When the transport further advances, the above described heating element of the thermal head 10 is energized to start print of desired characters or visual objects based on print data. In this example, a first text character (alphabet "A") of a character string "AAA" is first printed.

As shown in FIG. 5C for example, the alphabet "A" that is print data at this time is expanded as dot pattern data on an image buffer of the above described RAM 213, and is temporarily stored therein. This dot pattern data is dot matrix data of 12 dots in data width direction×16 dots in tape length direction=192 dots. This alphabet "A" dot pattern data contains, in the above described 192-dot matrix, a total of 54 dots (as on-dot number) of dots J1-L1, dots I2-J2, dots H3-I3, dots F4-H4, dots E5-H5, dots C6-E6, dots G6-H6, dots B7-C7, dots G7-H7, dots A8-B8, dots G8-H8, dots A9-B9, dots G9-H9, dots B10-C10, dots G10-H10, dots C11-E11, dots G11-H11, dots E12-H12, dots F13-H13, dots H14-I14, dots I15-J15, and dots J16-L16. In this case, an average on-dot number per one line is 54/16=3.38 and the printing rate from the entirety of the above described 192 dots is 54/192=28.1[%].

The power consumption by print of the thermal head 10 substantially corresponds to the printing rate of the dot pattern data as described above. The power consumption when print of the above described alphabet "A" is performed is the sum of the above described power consumption by transport and the power consumption by print based on the above described printing rate (28.1% in the above described example), and becomes a value larger than the power consumption of the above described front margin by the power consumption by print (see section (b)-(c)).

With further advancement of transport, in an inter-character margin that is an area from the completion of print of the above described first alphabet "A" up to the start of print of a second text character (alphabet "A") adjacent thereto, the non-print state again appears in which the above described heating element of the thermal head 10 is not energized. Since in this inter-character margin, only the above described power consumption by transport occurs without the above described power consumption by print, the power consumption of the inter-character margin becomes as small as the above described front margin (see section (c)-(d) of FIG. 5B).

With further advancement of transport, print of a second text character (alphabet "A") is performed. Since the second is also the alphabet "A" that is the same as the first, the power consumption becomes as large as the power consumption at the time when print of the first alphabet "A" as described above is performed (see section (d)-(e) of FIG. 5B).

With further advancement of transport, in an inter-character margin from the completion of print of the second alphabet "A" up to the start of print of a third text character (alphabet "A") adjacent thereto, the non-print state again appears in which the above described heating element of the thermal head 10 is not energized, and the power consumption of the inter-character margin becomes as small as the above described front margin (see section (e)-(f) of FIG. 5B).

With further advancement of transport, print of a third text character (alphabet "A") is performed. Since the third is also the alphabet "A" that is the same as the above described first and second, the power consumption becomes as large as the power consumption at the time when print of the first and second alphabet "A" as described above is performed (see section (f)-(g) of FIG. 5B).

Then, after the completion of print of all the characters and visual objects (in the above described example, after the completion of the third alphabet "A" of the character string "AAA"), a rear margin appears, resulting in a non-energized section where the energization of the above described heating element of the thermal head 10 is stopped so that print is not performed. Since in this rear margin, only the above described power consumption by transport occurs, the power consumption of the rear margin becomes as small as the above described front margin (see section (g)-(h) of FIG. 5B). It is to be noted that this state continues till the completion of production of the print label L to terminate the tape transport of the print-receiving tape 57, etc. by the drive of the above described drive motor 63.

In FIG. 5B, power consumption by print (average) is an average value obtained by averaging the sum total of the power consumption (section (b)-(c)) by print of the first alphabet "A", the power consumption (section (d)-(e)) by print of the second alphabet "A", and the power consumption (section (f)-(g)) by print of the third alphabet "A" by a section (section (b)-(g)) from the start of print of the first alphabet "A" up to the completion of print of the third alphabet "A", and is power consumption by print of those first to third text characters (alphabets "AAA").

Next, FIGS. 6A and 6B show an example of the change behaviors of the power consumption in the case that a print R of text characters "III" with a relatively small printing rate is print-formed to produce a print label L. The tape width of the print-receiving tape 57 is W that is the same as FIG. 5.

As shown in FIG. 6C, dot pattern data of the alphabet "I" at this time contains, in the above described 192-dot matrix, a total of 32 dots (as on-dot number) of dots A7-B7, dots K7-L7, dots A8-L8, dots A9-L9, dots A10-B10, and dots K10-L10. Accordingly, the average on-dot number per one line in this case is 32/16=2 and the printing rate from the entirety of the above described 192 dots is 32/192=16.7[%].

As shown, only the above described power consumption by transport occurs in a front margin (section (a)-(b) of FIG. 6B), an inter-character margin (section (c)-(d) of FIG. 6B) between first and second alphabets "I" and "I", an inter-character margin (section (e)-(f) of FIG. 6B) between the second and third alphabets "I" and "I", and a rear margin (section (g)-(h) of FIG. 6B). The power consumption at this time is the same level as the power consumption by transport shown in FIG. 5 because the tape width W is the same as the example of FIG. 5.

The power consumption by print similar to the above occurs in the first alphabet "I" (section (b)-(c) of FIG. 6B), the second alphabet "I" (section (d)-(e) of FIG. 6B), and the third alphabet "I" (section (f)-(g) of FIG. 6B). It is to be noted in this example that due to smaller printing rate than the alphabet "A" shown in FIG. 5 as described above, the power consumption by print (average) becomes smaller than the example shown in FIG. 5. In consequence, the power consumption at the time of production of the print label L decreases than the example shown in FIG. 5.

In this embodiment, the above described printing rate is calculated by the CPU 212 on the basis of dot pattern data of print data (the function as an example of the detection part). The printing rate in relation to the print label L produced in the past is stored and accumulated as a past operation history in the above described memory 214.

As can be seen from the comparison between the example of FIG. 5 and the example of FIG. 6 described above, in the case that the printing rate of the text character/visual object, etc. to be printed on the print-receiving tape 57 is low, electric power consumed by the thermal head 10 (in other words, heat energy to be applied by the thermal head 10) may be small. As a result, in the case of FIG. 6 where the heat energy is small, the charge stop voltage can be set lower than the case of FIG. 5 (see FIG. 8 described later).

FIGS. 7A and 7B show an example of the change behaviors of the power consumption in the case that the print label L is produced using the print-receiving tape 57 having a relatively small tape width W. In this example, similar to the example of FIG. 6, the print R of the text characters "III" is print-formed.

Similar to the above, in FIG. 7A, only the above described power consumption by transport occurs in a front margin (section (a)-(b) of FIG. 7B), an inter-character margin (section (c)-(d) of FIG. 7B) between first and second alphabets "I" and "I", an inter-character margin (section (e)-(f) of FIG. 7B) between the second and third alphabets "I" and "I", and a rear margin (section (g)-(h) of FIG. 7B). The power consumption at this time is the same level as the power consumption by transport shown in FIG. 5 because the tape width W is the same as the example of FIG. 5. However, the tape width W of the print-receiving tape 57 (in other words, the print label L) of this example is smaller than the tape width W shown in FIG. 6, allowing the print-receiving tape 57 to have a relatively small transport resistance. Therefore, the above described power consumption by transport decreases than the case of the example of FIG. 6. With the decrease of the above described tape width W, this example has the above described power consumption (average) smaller than the above described example of FIG. 6 in the first alphabet "I" (section (b)-(c) of FIG. 7B), the second alphabet "I" (section (d)-(e) of FIG. 7B), and the third alphabet "I" (section (f)-(g) of FIG. 7B). As a result, the power consumption at the time of production of the print label L decreases than the example shown in FIG. 6.

In this embodiment, the above described tape width W is detected by the cartridge sensor 32 as described above. The tape width W in relation to the print label L produced in the past is stored and accumulated as a past operation history in the above described memory 214.

As can be seen from the comparison between the example of FIG. 6 and the example of FIG. 7 described above, in the case that the tape width W of the print-receiving tape 57 is small, electric power consumed by drive motor 63 (in other words, kinetic energy to be applied to the drive motor 63) may be small Consequently, in the case of FIG. 7 where the kinetic energy is small, the charge stop voltage can be set lower than the case of FIG. 6 (see FIG. 8 described later).

Examples of the above described capacity-related information, other than the printing rate at the time of print formation and the tape width W of the print-receiving tape 57 described above, include the tape type (either non-laminate type or laminate type) of the print-receiving tape 57 and the ambient environmental temperature of the label producing apparatus 1. In the case that the tape type of the print-receiving tape 57 is the non-laminate type having the 4-layer structure described above, the required heat capacity is a lower capacity (than the case of the laminate type finally having the 5-layer structure described above), with the result that heat energy to be applied to the thermal head may be small, allowing the charge stop voltage to be set lower. In the case that the ambient environmental temperature is a relatively high temperature, electric power necessary for the above described operation mechanisms to operate may be small, allowing the charge stop voltage to be set lower.

In this embodiment, similar to the above, the above described tape type is detected by the cartridge sensor 32. The above described ambient environmental temperature is detected by the thermistor 35. The tape type and the ambient environmental temperature in relation to the print label L produced in the past are stored and accumulated as past operation histories in the above described memory 214.

<Variable Setting of Charge Stop voltage in Charging Process>

Using a graph of FIG. 8, description will be given of behaviors variably setting the charge stop voltage in accordance with the above described printing rate, tape width W, tape type, ambient environmental temperature, etc., in the above manner.

In this embodiment, charging of the above described battery power source BT is performed by the charging circuit 201 while detecting an output voltage value of the battery power source BT by the A/D input circuit 219, and the charging process terminates instantly the above described output voltage value of the battery power source BT reaches the charge stop voltage as a result of charging.

At that time, the value of the above described charge stop voltage is variably set, in accordance with the above described capacity-related information, to any one of a voltage VM that is a value within a range of e.g. 45-55% of a voltage VF corresponding to the fully charged state, a voltage VH that is a value within a range of e.g. 65-75% of the above described VF, and the above described voltage YF.

In the case that the charge stop voltage is set to the above described VM, as indicated by a two-dot chain line in FIG. 8, the charging circuit 201 starts charging of the battery power source BT from a start voltage value VS, and stops charging at the point of time when the above described output voltage value of the battery power source BT detected by the A/D input circuit 219 has reached the above described VM.

Similarly, in the case that the charge stop voltage is set to the above described VH, as indicated by a solid line in FIG. 8, the charging circuit 201 starts charging of the battery power source BT from the start voltage value VS, and stops charging at the point of time when the above described output voltage value of the battery power source BT detected by the A/D input circuit 219 has exceeded the above described VM and further reached the above described VH.

Similarly, in the case that the charge stop voltage is set to the above described VF, as indicated by a broken line in FIG. 8, the charging circuit 201 starts charging of the battery power source BT from the start voltage value VS, and stops charging at the point of time when the above described output voltage value of the battery power source BT detected by the A/D input circuit 219 has exceeded the above described VM, further exceeded the above described VH, and further reached the above described VF (=fully charged state).

<Decision Table for Deciding Charging Voltage>

In this embodiment, using a table (that is stored in advance in the above described memory 214) shown in FIG. 9, the above described CPU 212 performs variable setting of the charge stop voltage in accordance with the capacity-related information as described above. In this table (hereinafter, appropriately, referred to simply as "decision table") of FIG. 9, the above described charge stop voltage is variably set to any one of the above described VM (denoted by "○" in the table) corresponding to a usage form with a light load of the above described operation mechanism, the above described VH (denoted by "Δ" in the table) corresponding to a usage form with a normal load of the above described operation mechanism, and the above described VF (denoted by "●" in the table) corresponding to a usage form with a heavy load of the above described operation mechanism, in accordance with the contents of the printing rate, the tape width, the tape type, and the ambient environmental temperature described above as the above described capacity-related information deciding the charge stop voltage. That is, in this table, the values (contents) of the above described capacity-related information are classified into a plurality of stages. In this example, the above described printing rate is classified into two, i.e. large (=a second printing rate; 20% or more) and small (=a first printing rate; less than 20%), the above described tape width is classified into three, i.e. small (=a first size 6 [mm]), medium (12 [mm]), and large (=a second size; 24 [mm]), the tape type is classified into two, i.e. heat capacity small (=a first capacity; non-laminate type) and heat capacity large (=a second capacity; laminate type), and the above described ambient environmental temperature is classified into two, i.e. low temperature (=a second temperature; less than 10 [° C.]) and high temperature (=first temperature 10 [° C.] or more). Then, correlations between the above described divisions and the above described charge stop voltages corresponding thereto are recorded in advance.

In more detail, with the above described printing rate being relatively large (20% or more as a threshold value) and with the ambient environmental temperature being a relatively low temperature (less than 10° C. as the threshold value), the charge stop voltage is set to the above described VH when the above described tape type is the non-laminate type having a small required heat capacity and if the tape width W is small (W=6 [mm] in this example; the same applies hereinafter); the charge stop voltage is set to the above described VH if the tape width W is a medium level (W=12 [mm] in this example; the same applies hereinafter); and the charge stop voltage is set to the above described VF if the tape width W is large (W=24 [mm] in this example; the same applies hereinafter). On the other hand, when the above described tape type is the laminate type having a large required heat capacity, the charge stop voltage is set to the above described VH if the tape width W is small (W=6 [mm]); the charge stop voltage is set to the above described VF if the tape width W is a medium level (W=12 [mm]); and the charge stop voltage is set to the above described VF if the tape width W is large (W=24 [mm]).

With the above described printing rate being relatively large (20% or more as the threshold value) similar to the above and with the ambient environmental temperature being a relatively high temperature (10° C. or more as the threshold value), the charge stop voltage is set to the above described VH when the above described tape type is the non-laminate type having a small required heat capacity and if the tape width W is small (W=6 [mm]); the charge stop voltage is set to the above described VH if the tape width W is a medium level (W=12 [mm]); and the charge stop voltage is set to the above described VF if the tape width W is large (W=24 [mm]). On the other hand, when the above described tape type is the laminate type having a large required heat capacity, the charge stop voltage is set to the above described VH if the tape width W is small (W=6 [mm]); the charge stop voltage is set to the above described VH if the tape width W is a medium level (W=12 [mm]); and the charge stop voltage is set to the above described VF if the tape width W is large (W=24 [mm]).

In the case that the above described printing rate is relatively small (less than 20% as the threshold value) and that the ambient environmental temperature is relatively low (less than 10° C. as the threshold value), when the above described tape type is the non-laminate type having a small required heat capacity, the charge stop voltage is set to the above described VH if the tape width W is small (W=6 [mm]); the charge stop voltage is set to the above described VH if the tape width W is medium (W=12 [mm]); and the charge stop voltage is set to the above described VF if the tape width W is large (W=24 [mm]). On the other hand, when the above described tape type is the laminate type having a large required heat capacity, the charge stop voltage is set to the above described VH if the tape width W is small (W=6 [mm]); the charge stop voltage is set to the above described VH if the tape width W is medium (W=12 [mm]); and the charge stop voltage is set to the above described VF if the tape width W is large (W=24 [mm]).

In the case that the printing rate is relatively small (less than 20% as the threshold value) as described above and that the ambient environmental temperature is relatively high (10° C. or more as the threshold value), when the above described tape type is the non-laminate type having a small required heat capacity, the charge stop voltage is set to the above described VM if the tape width W is small (W=6 [mm]); the charge stop voltage is set to the above described VM if the tape width W is medium (W=12 [mm]); and the charge stop voltage is set to the above described VH if the tape width W is large (W=24 [mm]). On the other hand, when the above described tape type is the laminate type having a large required heat capacity, the charge stop voltage is set to the above described VM if the tape width W is small (W=6 [mm]); the charge stop voltage is set to the above described VH if the tape width W is medium (W=12 [mm]); and the charge stop voltage is set to the above described VH if the tape width W is large (W=24 [mm]).

As seen from the above, in the above described decision table, in the case that the tape width is on the narrow width side (in other words, on the small size side) (on condition that the other conditions are the same), the above described charge stop voltage is set lower as compared to the case that the tape width is on the wide width side (in other words, on the large size side). Additionally, in the case that the required heat capacity of the tape is on the low capacity side (on condition that the other conditions are the same), the above described charge stop voltage is set lower as compared to the case that the required heat capacity of the tape is on the high capacity side. Additionally, in the case that the printing rate is on the low printing rate side (on condition that the other conditions are the same), the above described charge stop voltage is set lower as compared to the case that the printing rate is on the high printing rate side.

<Control Procedure>

FIG. 10 shows a control procedure executed by the above described CPU 212 of the label producing device 1 so as to implement the technique of the charging process described above.

In FIG. 10, first, at the start of the charging process (in this example, before the start of the charging process at step S35 described later, the same applies hereinafter), the CPU 212 executes steps S10 to S30. Specifically, first, at step S10, the CPU 212 determines whether or not the label producing device 1 is connected to the above described AC power source serving as an external power source. Specifically, when the above described AC power plug 232 is inserted into the above described AC power source and the above described USB cable 233 connected to the AC power plug 232 is inserted into the USB jack 231, the label producing device 1 (in particular, the power source circuit 215) is connected through the USB cable 233 to the above described AC power source. Until the label producing device 1 is connected to the AC power source in this way, the determination of step S10 is negative (S10:NO), and the CPU 212 waits in a loop. If the label producing device 1 is connected to the above described AC power source, the determination of step S10 becomes affirmative (S10:YES), and the procedure goes to step S15.

At step S15, the CPU 212 acquires the past operation history stored in the memory 214. This leads to the acquisition of the capacity-related information, i.e., the tape width, the tape type, the ambient environmental temperature, and the printing rate, stored as the past operation history in the memory 214 as described above. The process executed at step S15 corresponds to an information acquisition process described in claims. On completion of step S15, the procedure goes to step S20.

At step S20, the CPU 212 decides the charge stop voltage (=charge stop voltage process) by using the above described decision table shown in FIG. 9 described above on the basis of the past operation history acquired at the above described step S15.

Specifically, first, by using the above described capacity-related information in the above described operation history at the past multiple times of production of the print label L (N times in the case that N is an integer of 2 or more. e.g., N=20 in this example) from the previous charge until this charge, it is decided which of the above described VM (hereinafter appropriately denoted by "○"), the above described VH (hereinafter appropriately denoted by "Δ"), or the above described VF (hereinafter appropriately denoted by "●") should has been the charge stop voltage applied in each of the times.

For example, it is assumed that the respective charge stop voltages applied in the above described 20 times should have been in the order of ○Δ○○○Δ●○○○ΔΔΔ○ΔΔΔ○○○ from the first time to the 20th time. In this case, the above described VF (●) corresponding to the above described usage form under the heavy load, the above described VH (Δ) corresponding to the above described usage form under the normal load, and the above described VM (○) corresponding to the above described usage form under the light load account for 5% (once), 40% (8 times), and 55% (11 times), respectively, of the total of 20 times. Therefore, the most frequent charge stop voltage (corresponding to a first voltage value) is the above described VM (○). The process of executing this decision corresponds to a first decision process described in claims.

On the other hand, in this embodiment, a tendency of most recent usage methods is also given attention. Specifically, focusing on most recent M times out of the above described N times (M is an integer of 1 or more and less than N, and M=10 in the above described example of N=20), for example, from the 11th time to the 20th time in the method of counting described above, the respective charge stop voltages applied in the respective times should be in the order of ΔΔΔ○ΔΔΔ○○○ from the 11th time to the 20th time. The above described VF (●) corresponding to the above described usage form under the heavy load, the above described VH (Δ) corresponding to the above described usage form under the normal load, and the above described VM (○) corresponding to the above described usage form under the light load account for 0% (zero), 60% (6 times), and 40% (4 times), respectively, of the total of 10 times. Therefore, the most frequent charge stop voltage (corresponding to a second voltage value) is the above described VH (Δ). The process of executing this decision corresponds to a second decision process described in claims.

On the basis of the determination result from the total of 20 times (the VM (○) is the most frequent) and the determination result from the most recent 10 times (the VH (Δ) is the most frequent), the safer result for a charging process (the result having a higher charge stop voltage) is selected, and therefore, the VH (Δ) is defined as a recommended stop voltage (corresponding to a third voltage value) recommended as the charge stop voltage. The process of executing this decision corresponds to a third decision process described in claims. The process executed at step S20 corresponds to a voltage decision process described in claims. On completion of step S20, the procedure goes to step S25.

At step S25, the CPU 212 outputs a control signal to the liquid crystal display 205 and displays the recommended stop voltage decided at step S20 on the display 205 (or on the display part 404 of the operation terminal 400). Subsequently, the procedure goes to step S30.

At step S30, the CPU 212 determines whether or not the recommended stop voltage displayed at step S25 is selected by the user. The determination of step S30 is negative (S30:NO) until the user confirms the recommended stop voltage displayed on the liquid crystal display 205 (or the display part 404) and selects the recommended stop voltage by operating the operation part 3 (or the operation part 403 of the operation terminal 400), and the CPU 212 waits in a loop. When the displayed recommended stop voltage is selected, the determination of step S30 becomes affirmative (S30:YES), and the procedure goes to step S35.

At step S35, the CPU 212 outputs a control signal to the charging circuit 20 and instructs the charging circuit 201 to start charging to the recommended stop voltage decided at step S20 and displayed at step S25 so that the charging of the battery power source BT is started. On completion of step S35, the procedure goes to step S40.

At step S40, the CPU 212 determines whether or not the charging voltage (output voltage value) of the battery power source BT detected by the A/D input circuit 219 has reached the charge stop voltage (i.e., the recommended stop voltage) decided at the above described step S20. If the charging voltage of the battery power source BT is less than the above described recommended stop voltage, the determination of step S40 is negative (S40:NO), and the CPU 212 waits in a loop, and if the charging voltage reaches the above described recommended stop voltage, the determination of step S40 becomes affirmative (S40:YES), and the procedure goes to step S45.

At step S45, the CPU 212 outputs a control signal to the charging circuit 201 to stop charging the battery power source BT. The processes executed at steps S35, S40, and S45 correspond to a charging control process described in claims. This flow is then terminated.

Advantages of Embodiment

As described above, the label producing device 1 according to this embodiment acquires the capacity-related information (the printing rate of the print data, the tape width W of the print-receiving tape 57, and the laminate/non-laminate tape type, and the ambient environmental temperature of the label producing device 1 in the above described example) corresponding to electric power consumption (in other words, the charging capacity of the battery power source BT) required for operation of the plurality of operation mechanisms (the driving motor 63 and the thermal head 10 in the above described example) and serving as a material for determining whether or not the necessity for achieving the fully-charged state is high (see the above described step S15). The charge stop voltage to be applied is decided in accordance with the acquired capacity-related information (see the above described step S20). As a result, for example, in the case that the width W of the print-receiving tape 57 is relatively narrow, that the required heat capacity of the print-receiving tape 57 is low (i.e., in the case of the non-laminate-type cartridge 30), or that the above described printing rate is low, the thermal energy to be applied to the thermal head 10 or the kinetic energy to be applied to the driving motor 63 may be made small, so that the charge stop voltage is set lower. Additionally, also in the case that the ambient environmental temperature is relatively high, the electric power required for operation of the operation mechanisms may be made small, so that the charge stop voltage is set lower as described above (see FIG. 9).

As a result, in the case that it is not particularly necessary to achieve the fully-charged state as described above, the charging can be stopped at the voltage (the VM and the VH) lower than the fully-charged state to prevent the deterioration of the battery power source BT and reliably prolong the life thereof.

Particularly in this embodiment, pieces of the above described past capacity-related information (the tape width W detected by the cartridge sensor 32, the environmental temperature detected by the thermistor 35, the printing rate calculated and quantified by the CPU 212 in the above described example) detected at the time of the producing operations of the past print labels L are accumulated as the past operation history in the memory 214 and acquired from the memory 214 at the start of the charging process executed by the charging circuit 201, and the charge stop voltage is decided in accordance with these pieces of the past capacity-related information. As a result, for example, in the case that the past operation form in the operation function of the label producing device 1 has a tendency not to require a large charging capacity (see, e.g., the 20 usage forms having the charge stop voltages to be applied represented in the order of ○Δ○○○Δ●○○○ΔΔΔ○ΔΔΔ○○○), the charge stop voltage can reliably be set lower accordingly, and the deterioration of the battery power source BT can reliably be prevented.

Particularly in this embodiment, in the case that the ambient environmental temperature is on the high temperature side, the charge stop voltage is decided lower than the charge stop voltage in the case that the above described ambient environmental temperature is on the low temperature side (see FIG. 9). As a result, in accordance with the fact that the electric power required for operation of the operation mechanisms may be made small in the case that the ambient environmental temperature is relatively high, the charge stop voltage can be decided lower in such a case that the necessity for achieving the fully-charged state is low, and the deterioration of the battery power source BT can reliably be prevented.

Particularly in this embodiment, in the case that the tape width W defined as the size information of the above described print-receiving tape 57 is on the small size side (i.e., the narrow width side), the charge stop voltage is decided lower as compared to the case that the tape width W is on the large size side (i.e., the wide width side) (see FIG. 9). As a result, in accordance with the fact that the kinetic energy to be applied to the print-receiving tape 57 etc. by the driving motor 63 can be made small, the charge stop voltage can be decided lower in such a case that the necessity for achieving the fully-charged state is low, and the deterioration of the battery power source BT can reliably be prevented.

Particularly in this embodiment, in the case that the required heat capacity information of the above described print-receiving tape 57 (in other words, the type information of the print-receiving tape 57, i.e., the type information of the cartridge 30) is acquired and indicates the low capacity side (e.g., the non-laminate tape), the charge stop voltage is decided lower than the charge stop voltage in the case that the information indicates the high capacity side (e.g., the laminate tape) (see FIG. 9). As a result, in accordance with the fact that the thermal energy to be applied to the thermal head 10 may be made small in the case that the required thermal capacity of the print-receiving tape 57 is relatively low, the charge stop voltage can be decided lower in such a case that the necessity for achieving the fully-charged state is low, and the deterioration of the battery power source BT can reliably be prevented.

Particularly in this embodiment, in the case that the above described printing rate at the time of printing is on the low printing rate side (e.g., in the case of printing only characters), the charge stop voltage is decided lower as compared to the case that the above described printing rate is on the high printing rate side (e.g., in the case of image printing) (see FIG. 9). As a result, in accordance with the fact that the thermal energy to be applied to the thermal head 10 may be made small in the case that the printing rate is relatively low, the charge stop voltage can be decided lower in such a case that the necessity for achieving the fully-charged state is low, and the deterioration of the battery power source BT can reliably be prevented.

The present disclosure is not limited to the embodiment and can variously be modified without departing from the spirit and the technical ideas thereof. Such modification examples will hereinafter be described in order.

(1) In the Case that the Charge Stop Voltage is Decided on the Basis of the Tape Width Etc. Detected in Real Time at the Start of the Charging Process In the above described embodiment, in the case that a charging process is newly executed by an operator's operation while respective pieces of the above described capacity-related information at the time of production of the past print labels L are stored in advance as the operation history in the memory 214, the charge stop voltage (in the current charging process) is decided at the start of the charging process in accordance with the past capacity-related information; however, the present disclosure is not limited thereto. Specifically, in the case that a charging process is newly executed by an operator's operation, the corresponding charge stop voltage (of the current charging process) may be decided on the basis of the capacity-related information detected at this time point (at the start of the charging process). A control procedure executed by the above described CPU 212 in such a modification example will be described with reference to FIG. 11 corresponding to the above described FIG. 10, and FIG. 12.

In FIG. 11, this flow is different from FIG. 10 in that step S15 of the flow of FIG. 10 is not included and step S20' is included instead of step S20. Specifically, in FIG. 11, as in the above described FIG. 10, if the label producing device 1 is connected to the above described AC power source and the determination becomes affirmative at step S10 (S10: YES), the procedure goes to newly included step S20'.

At step S20', a charge stop voltage decision process is executed on the basis of the current capacity-related information (see FIG. 12 described later). Subsequent steps S25 to S45 are the same as those of the above described FIG. 10 and will not be described.

FIG. 12 is a flowchart showing a detailed procedure of the charge stop voltage decision process of the above described step S20'.

In FIG. 12, first, at step S110, the CPU 212 determines whether or not the cartridge sensor 32 can detect the tape cartridge 30. For example, in the case that the tape cartridge 30 is attached to the cartridge holder 8 at this time point and the cartridge sensor 32 detects the tape cartridge 30 (i.e., the type of the tape cartridge 30, or in other words, the type of the print-receiving tape 57, can be detected), the determination of step S110 is affirmative (S110:YES), and the procedure goes to step S120 described later. In this case, the cartridge sensor 32 outputs a detection signal indicative of the type information of the tape cartridge 30 (i.e., whether the cartridge has the print-receiving tape 57 corresponding to the non-laminate type or the above described base tape and the cover film corresponding to the laminate type), and the CPU 212 acquires the tape width information and the tape type of the corresponding print-receiving tape 57 on the basis of the detection signal.

On the other hand, in the case that the tape cartridge 30 is not attached to the cartridge holder 8 at this time point or that the cartridge sensor 32 cannot detect the tape cartridge 30 due to some error although attached, the determination of step S110 is negative (S110:NO), and the procedure goes to step S115.

At step S115, the CPU 212 performs setting on the assumption that a result of detection by the cartridge sensor 32 indicates a laminate type and a large tape width corresponding to the most severe condition from the viewpoint of power consumption (in other words, the viewpoint of the charging capacity required for operation of the above described operating mechanisms) in terms of the production of the print label L (see FIG. 9). As a result, in this case, at step S140 described later, the tape cartridge 30 is handled as being of the laminate type and having the large tape width W. On completion of step S115, the procedure goes to step S120.

At step S120, the CPU 212 determines whether or not the thermistor 35 can detect the above described ambient environmental temperature. In the case that the thermistor 35 detects the ambient environmental temperature of the label producing device 1, the determination of step S120 is affirmative (S120:YES), and the procedure goes to S130 described later. In this case, the thermistor 35 outputs a detection signal indicative of the ambient environmental temperature, and the CPU 212 acquires the above described corresponding ambient environmental temperature on the basis of the detection signal.

On the other hand, for example, in the case that the thermistor 35 is not active or that the above described ambient environmental temperature cannot be detected due to some other error at this time point, the determination of step S120 is negative (S120:NO), and the procedure goes to step S125.

At step S125, the CPU 212 performs setting on the assumption that a result of detection by the thermistor 35 (the ambient environment temperature) indicates a low temperature (less than 10° C. see FIG. 9) corresponding to the most severe condition from the viewpoint of power consumption in terms of the production of the print label L. As a result, in this case, at step S140 described later, the ambient environment temperature is handled as the above described low temperature less than 10° C. On completion of step S125, the procedure goes to step S130.

At step S130, the CPU 212 determines whether or not the printing rate described above can be calculated on the basis of the print data. If the print data is already generated and developed in the image buffer of the RAM 213, the printing rate can be calculated from the dot pattern data of the print data, so that the determination of step S130 is affirmative (S130:YES) and the procedure goes to S140. If the print data is not yet generated, the printing rate cannot be calculated, so that the determination of step S130 is negative (S130: NO), and the procedure goes to step S135.

At step S135, the CPU 212 performs setting on the assumption that the above described printing rate is a large printing rate (20% or more. see FIG. 9) corresponding to the most severe condition from the viewpoint of power consumption in terms of the production of the print label L. As a result, in this case, at step S140 described later, the printing rate is handled as the above described large printing rate of 20% or more. On completion of step S135, the procedure goes to step S140. The processes executed at the above described steps S110, S120, and S130 correspond to the information acquisition process in this modification example.

At step S140, the CPU 212 applies the decision table of FIG. 9 to the combination of the tape width and tape type acquired at the above described step S110 (or set on the assumption at the above described step S115), the ambient environmental temperature acquired at the above described step S120 (or set on the assumption at the above described step S125), and the printing rate acquired at the above described step S130 (or set on the assumption at the above described step S135) and thereby decides any one of the above described VM ("○" in FIG. 9) corresponding to the usage form under the light load of the above described operation mechanisms, the above described VH ("Δ" in FIG. 9) corresponding to the usage form under the normal load of the above described operation mechanisms, and the above described VF ("●" in FIG. 9) corresponding to the usage form under the heavy load of the above described operation mechanisms as the charge stop voltage used at the time of the current charging process. The process executed at step S140 corresponds to the charge stop voltage decision process in this modification example. On completion of step S140, the process returns to step S25 of FIG. 11.

In this modification example, as in the above described embodiment, in the case that it is not particularly necessary to achieve the fully-charged state, the charging can be stopped at the voltage (the VM and the VH) lower than the fully-charged state to prevent the deterioration of the battery power source BT and reliably prolong the life thereof. Particularly, in this modification example, the charge stop voltage is decided in accordance with the above described capacity-related information at the present time when the charging process is about to be started. Therefore, for example, in the case that the capacity-related information corresponding to the current state of the label producing device 1 has contents not so much requiring a large charging capacity, the charge stop voltage can reliably be set lower accordingly, and the deterioration of the battery power source BT can reliably be prevented.

(2) Combining the Techniques of the Above Described Embodiment and the Modification Example Specifically, the technique of acquiring the past capacity-related information at the start of the charging process and deciding the corresponding charge stop voltage in the above described embodiment may be combined with the technique of deciding the corresponding charge stop voltage on the basis of the current capacity-related information detected at the time point of the start of the charging process in the above described modification example Specifically, for example, in several charging processes newly performed in the future, the corresponding charge stop voltage may be decided (by the technique of the above described modification example) on the basis of the capacity-related information at the time point of the start of the charging process, and in charging processes after the several charging processes, the corresponding charge stop voltage may be decided (by the technique of the embodiment) on the basis of the above described capacity-related information included in the operation history at the time of production of the print label L after each of the above described several charging processes.

(3) Other

The description has been made by using the label producing device performing printing on a print-receiving tape having a desired tape as an example of the printer; however, the present disclosure is not limited thereto. Specifically, the present disclosure is applicable to an ordinary printer performing printing on A4 paper. In this case, the above described size information is the size of the paper.

The description has been made of the case of applying the present disclosure to the above described printer that is an example of the electronic apparatus; however, the present disclosure is not limited to the printer. Specifically, the present disclosure is applicable to other electronic apparatuses including a rechargeable battery power source and performing a charging process for the battery power source, for example, a digital camera, a music player, a portable terminal, and a personal computer. Regarding the above described operation mechanisms, in the case of the digital camera, the above described technique is applicable to a display function of an LCD etc., a strobe function, and a shutter function; in the case of the music player, the above described technique is applicable to a content reproduction function, a liquid crystal display function, etc.; and in the case of the portable terminal or the personal computer, the above described technique is applicable to a display function, a communication function via a network, etc., button/keyboard/mouse operation functions, etc. In these cases, the same advantages are acquired as well.

The arrows shown in FIG. 4 indicate an example of a signal flow and are not intended to limit the signal flow directions.

The flowcharts shown in FIGS. 10, 11, and 12 are not intended to limit the present disclosure to the procedures shown in the above described flows, and the procedures may be added/deleted or may be executed in different order without departing from the spirit and the technical ideas of the disclosure.

The techniques of the above described embodiment and modification examples may appropriately be utilized in combination other than those described above.

What is claimed is:

1. An electronic apparatus, comprising:

a battery storage part configured to store a battery power source that is rechargeable;

a power source connecting part configured to connect said electronic apparatus to an external power source;

a charging device configured to perform a charging process from said external power source to said battery power source by using connection of said power source connecting part to said external power source as a charging trigger;

a plurality of operation mechanisms configured to perform predetermined respective operations with electric power supplied from said battery power source;

a detection part configured to detect capacity-related information, and a first memory configured to accumulate said capacity-related information detected by said detection part as an operation history, a second memory configured, when values of said capacity-related information are sectioned into a plurality of levels, to store a correlation between each section and a charge stop voltage corresponding to each section, and a CPU, said CPU being configured to execute:

an information acquisition process for acquiring capacity-related information corresponding to a charging capacity required for operation of said operation mechanisms, wherein said capacity-related information accumulated in the past in said first memory is acquired at the start of said charging process by said charging device;

a voltage decision process for deciding the charge stop voltage in accordance with said capacity-related information acquired in said information acquisition process, wherein said charge stop voltage corresponding to said capacity-related information in the past acquired in said information acquisition process is decided at the start of said charging process by said charging device, and wherein said voltage decision process comprises:

a first decision process for deciding, on the basis of said correlations stored in said second memory, a first voltage value that is the most frequent of N (N is an integer of 2 or more) charge stop voltage values respectively corresponding to N pieces of said capacity-related information serving as said operation history, a second decision process for deciding, on the basis of said correlations stored in said second memory, a second voltage value that is the most frequent of M (M is an integer of 1 or more and less than N) charge stop voltage values that are most recent included in said N charge stop voltage values, and a third decision process for deciding a third voltage value that is the value of finally applied charge stop voltage, on the basis of said first voltage value decided by said first decision process and said second voltage value decided by said second decision process; and a charging control process for controlling said charging device to stop said charging process by using as a charge stop trigger an attainment of said charge stop voltage decided in said voltage decision process after start of said charging process.

2. The electronic apparatus according to claim 1, wherein in said third decision process, higher one of said first voltage value and said second voltage value is decided as said third voltage value.

3. The electronic apparatus according to claim 1, further comprising:

a detection part configured to detect said capacity-related information, wherein in said information acquisition process, said capacity-related information at the start of said charging process by said charging device is acquired, the capacity-related information being detected by said detection part at said start, and wherein in said voltage decision process, at the start of said charging process by said charging device, said charge stop voltage corresponding to said capacity-related information at said start acquired in said information acquisition process is decided.

4. The electronic apparatus according to claim 1, wherein in said information acquisition process, an ambient environment temperature of said operation mechanisms is acquired as said capacity-related information, and wherein in said voltage decision process, in the case that said ambient temperature is a first temperature, said charge stop voltage is decided lower than said charge stop voltage in the case that said ambient temperature is a second temperature lower than said first temperature.

5. The electronic apparatus according to claim 1, wherein the electronic apparatus is a printer including, as said operation mechanisms, a thermal head configured to perform desired printing on a print-receiving matter by using electric power from said battery power source and a driving motor configured to drive a feeder configured to feed said print-receiving matter by using electric power from said battery power source.

6. The electronic apparatus according to claim 5, wherein in said information acquisition process, size information of said print-receiving matter is acquired as said capacity-related information, and wherein in said voltage decision process, in the case that said size information indicates a first size, said charge stop voltage is decided lower than said charge stop voltage in the case that said size information indicates a second size larger than said first size.

7. The electronic apparatus according to claim 6, wherein said thermal head is configured to perform printing on a print-receiving tape serving as said print-receiving matter, and wherein in said information acquisition process, a tape width of said print-receiving tape is acquired as said size information.

8. The electronic apparatus according to claim 5, wherein in said information acquisition process, required heat capacity information of said print-receiving matter is acquired as said capacity-related information, and wherein in said voltage decision process, in the case that said required heat capacity information indicates a first capacity, said charge stop voltage is decided lower than said charge stop voltage in the case that said required heat capacity information indicates a second capacity higher than said first capacity.

9. The electronic apparatus according to claim 5, wherein in said information acquisition process, type information of said print-receiving tape serving as said print-receiving matter is acquired as said capacity-related information, and wherein in said voltage decision process, in the case that said print-receiving tape is a non-laminate type tape including a print-receiving layer on which a print is formed by said thermal head, said charge stop voltage is decided lower than said charge stop voltage in the case that said print-receiving tape is a laminate type tape affixed to a base tape after a print is formed by said thermal head.

10. The electronic apparatus according to claim 5, wherein in said information acquisition process, printing rate information at a time of execution of said printing is acquired as said capacity-related information, and wherein in said voltage decision process, in the case that said printing rate information indicates a first printing rate, said charge stop voltage is decided lower than said charge stop voltage in the case that said printing rate information indicates a second printing rate higher than said first printing rate.

11. The electronic apparatus according to claim 1, wherein said battery storage part is configured to store said battery power source that includes a lithium ion battery.

12. A printer, comprising:

a battery storage part configured to store a battery power source that is rechargeable;

a power source connecting part configured to connect said printer to an external power source;

a charging device configured to perform a charging process from said external power source to said battery power source by using connection of said power source connecting part to said external power source as a charging trigger;

a plurality of operation mechanisms configured to perform predetermined respective operations with electric power supplied from said battery power source; and a CPU, said CPU being configured to execute:

an information acquisition process for acquiring capacity-related information corresponding to a charging capacity required for operation of said operation mechanisms, wherein the capacity-related information is selected from a group including: an ambient environment temperature of said operation mechanisms; size information of a print-receiving matter; required heat capacity information of said print-receiving matter; type information of a print-receiving tape serving as said print-receiving matter; and printing rate information at a time of execution of printing;

a voltage decision process for deciding a charge stop voltage in accordance with said capacity-related information acquired in said information acquisition process; and a charging control process for controlling said charging device to stop said charging process by using as a charge stop trigger an attainment of said charge stop voltage decided in said voltage decision process after start of said charging process.

13. An electronic apparatus, comprising:

a battery storage part configured to store a battery power source that is rechargeable;

a power source connecting part configured to connect said electronic apparatus to an external power source;

a charging device configured to perform a charging process from said external power source to said battery power source by using connection of said power source connecting part to said external power source as a charging trigger;

a plurality of operation mechanisms configured to perform predetermined respective operations with electric power supplied from said battery power source; and a CPU, said CPU being configured to execute:

an information acquisition process for acquiring capacity-related information corresponding to a charging capacity required for operation of said operation mechanisms;

a voltage decision process for deciding a charge stop voltage in accordance with said capacity-related information acquired in said information acquisition process;

a selection display process for displaying a recommended stop voltage mode for determining said charge stop voltage decided in said voltage decision process to a recommended stop voltage;

a reception process for receiving a selection of said recommended stop voltage mode displayed in said selection display process; and a charging start process for controlling said charging device to start said charging process in the case that the selection of said recommended stop voltage mode is received in said reception process.

* * * * *